United States Patent [19]
Weber

[11] Patent Number: 5,780,990
[45] Date of Patent: Jul. 14, 1998

[54] PARASYNCHRONOUS INDUCTION MOTOR CONTROL METHOD AND APPARATUS

[76] Inventor: Harold J. Weber, P.O. Box 6161, 560 Washington St., Holliston, Mass. 01746

[21] Appl. No.: 813,791

[22] Filed: Mar. 6, 1997

[51] Int. Cl.$^6$ ........................................................ H02P 7/00
[52] U.S. Cl. ............................ 318/807; 318/729; 318/438
[58] Field of Search ........................... 318/727, 772–777, 318/798–815, 729, 767–771, 61–82, 720–724, 437, 438

[56] References Cited

U.S. PATENT DOCUMENTS

| 4,019,105 | 4/1977 | Cornell et al. | 318/803 |
|---|---|---|---|
| 4,160,940 | 7/1979 | Wolf | 318/803 |
| 4,658,192 | 4/1987 | Casteel et al. | 318/257 |
| 4,703,246 | 10/1987 | Sakamoto et al. | 318/809 |
| 4,712,054 | 12/1987 | Boldt | 318/758 |
| 5,463,300 | 10/1995 | Oximberg | 318/801 |

OTHER PUBLICATIONS

"Voltage–Fed Inverter for Control of Synchronous Induction Motor", Carol Oximberg, pp. 16b–18b, *NASA Tech Briefs* Magazine, Oct. 1996.
"Emerson Inside Technologies Make Your Home a Better Place to Live", David O. Gifford, 8 pages, *Emerson Motor Company Brochures*, Fall 1996.
"Exclusive AM Study: Motors", Joe Jancsurak, pp. 28–32, *AM:Appliance Manufacturer* Magazine, Oct. 1996.
"Advanced Semiconductors Signal New Era Ahead for Appliance Motors", Bruno Maurice, pp. 32–38 (4 pages), *AM:Appliance Manufacturer* Magazine, Oct. 1996.
"Power Factor Correction", Michael Petagna, pp. 68–73, *AM:Appliance Manufacturer* Magazine, Oct. 1996.
"Small Motors: Costlier Materials+Simple Design=Affordable Efficiency", Tom Andel, Technical Editor; pp. 53–54, *AM:Appliance Manufacturer* Magazine, Sep. 1990.

"Section 1: Motors", pp. 9–48 (28 pages), *Machine Design* Magazine, May 15, 1980.
"Section 2: Motor Controls and Protectors", pp. 87–100 (13 pages), *Machine Design* Magazine, May 15, 1980.
"Get Ready for ISO 14000", Don Mackay, p. 11, *AM:Appliance Manufacturer* Magazine, May 1995.
"Increasing the High Speed Torque of Bipolar Stepper Motors", Steven Hunt, *National Semiconductor* Application Note 828, May 1993.

*Primary Examiner*—Jonathan Wysocki

[57] ABSTRACT

Alternating current electric induction motor operating from a source of AC electric power is driven at a parasynchronous rate of field collapse and magnetic flux reversal which is derived from the immediate train of alternating half-wave power cycles supplied by the AC power source. The higher and lower rates of magnetic flux field reversal result in a corresponding higher or lower rate of magnetic flux field rotation than that which is ordinarily produced. In a subsynchronous operating mode, bicyclic half-cycles of AC power are polarity-paired through inversion of one of the component half-cycles and successive pairs are alternated in polarity, thereby parasynchronously decreasing the effective rotating magnetic flux field rate. In a suprasynchronous mode, individual AC power half-cycles are split into quarter-cycle quadrants and the quadrants are successively alternated in polarity, thereby parasynchronously increasing the effective rotating magnetic flux field rate. A novel induction motor construction having two parallel RUN windings, with each winding sequentially excited in opposite directions by the parasynchronous power pulses simplifies intercycle switching circuitry. Shaft speed of a common 2-pole AC motor which ordinarily runs just shy of 3,600 RPM from 60 Hertz AC power now runs pseudosynchronously runs shy of 1,800 RPM in the subsynchronous mode and near 7,200 RPM in the suprasynchronous mode.

21 Claims, 15 Drawing Sheets

PARASYNCHRONOUS INDUCTION MOTOR CONTROL METHOD AND APPARATUS

BACKGROUND OF MY INVENTION

Induction motors that operate from alternating current electric power find ubiquitous application in today's modern world of machines and appliances. In the United States, commercial utility AC (viz. alternating current) electric power is universally provided at a frequency of 60 Hertz (viz. cycles per second), whereas many other countries (and in particular European countries) utilize 50 Hertz AC electric power. It is also well known that AC induction motors commonly operate with a shaft rotation speed about 95–96 percent that of the true synchronous speed (e.g., with 4–5% speed-slip). Common engineering practice shows that the slip speed corresponds with a slip frequency which determines the efficacity of coupling of magnetic field lines produced in the stator (field) with the "shorted" turns represented by the "bars" which function as "shorted-turn windings" and constitute a portion of the rotor construction. In other words, the greater the slip, the higher the slip frequency and the greater the induced coupling of magnetic lines between the excited field windings (stator) and the shorted rotor "windings", in accord with the well known dv/dt rate of change related induction principles of electromagnetic field intercoupling. Mere example demonstrates that for a 2-pole induction motor operated from 60 (50) Hertz power, with a loaded shaft speed of 3,450 (2,875) RPM the slip speed approximates 150 (125) RPM.

In a most elemental form the induction motor's operating principle represents a rotating transformer configuration wherein physically stationary field windings constitute a primary presenting a virtual rotation of the field winding induced magnetic flux field, while the rotor construction functions as a secondary and is equivalent to a shorted turn. As a result, the rotor trys to rotate near the same speed as the rotating magnetic flux field. Good design practice further dictates that for best operating torque and efficiency the air gap clearance between the stator core and the rotor core material ought to be minimal, resulting in a condition commonly known as tight coupling.

Ordinarily, the extent of rotational speed slip self-regulates to a differential level which produces just sufficient stator to rotor field coupling and resulting induced "opposing magnetic field" effects to overcome inherent frictional losses plus any connected mechanical load. In other words, the slip essentially determines the absolute level of "twisting" torque produced by the rotor. It is well known that an unloaded AC induction motor runs faster (approaching but of course not quite reaching synchronous speed) while a fully loaded common type of motor typically rums less than about 96% of the synchronous speed.

Synchronous speed SSPD may be derived from the AC power prime line frequency PLF and number of motor poles NP through computation:

$$SSPD = (PLF \times 120)/NP \quad (1)$$

For minimal design 2-pole motor operating from 60 Hertz (hereinafter, 50 Hertz values, such as frequency and RPM, are given in parenthesis), synchronous speed is 3,600 (3,000) RPM (viz revolutions per minute), while loaded speed, allowing about 4% slip may be 3,450 (2,880) RPM. This ordinarily about as fist as a fully-loaded common induction motor may reasonably be designed to operate when directly excited from a standard 60 (50) Hertz AC line power. Therefore it is well documented that most AC induction motors run about 1,725 RPM (4-pole field) or 3,450 RPM (2-pole field), or in some cases 1,140 RPM (6-pole field). Of this type of motor, the "capacitor start" and "split phase start" category of induction motors are most common. The art also shows that many "intermediate" speed induction motors do exist: particularly in the so-called PSC (permanent split capacitor) and shaded pole motor designs. However these latter types are for the most part merely "high-slip" variants of the standard and commonly configured 2-pole, 4-pole, or 6-pole induction motor field constructions. The high-slip factor is typically accomplished by increasing the air-gap clearance between the motor's stator and rotor, with resulting efficiency loss and load influenced speed dependence. The increased air gap tends to increase the motor's magnetic path reluctance, thereby hindering the loaded power factor.

Higher slip is also obtained through burying the shoring bars which constitute the rotor "winding" more deeply inside the rotor core structure, hence increasing the reluctance of the magnetic field coupling path. Such a design compromise, when implemented in order to obtain slower speeds, is ordinary a tradeoff between the objective speed and net motor efficiency. Again, the increased magnetic path reluctance tends to decrease the motor's loaded power factor and performance efficiency.

Known also in the art is a field of multiphase (e.g., 2-phase and 3-phase) induction motors which may benefit from my invention's ability to produce alternative speed operation. I contend that my explored teachings which are herewithin described may be readily extrapolated into these multiphase motor constructions.

Designers of electrical machines are frequently faced with an engineering dilemma wherein a motor is needed which either runs faster or slower than what the commonly engineered motor designs may provide. Although these requirements appear to be divergent demands, my invention teaches how the synchronous utilization of the half-wave AC power cycles can be partitioned into quadrants of energy or paired as half-cycle clusters to create a parasynchronous excitation of the motor field. Understand that the term "parasynchronous" refers to the alternating magnetic field insofar as the field and stator poles fully reverse their respective NORTH/SOUTH polar field sense in synchronization with the AC power source prime line frequency, but usually at one-half (e.g., subsynchronously) or else double (e.g., suprasynchronously) the rate of the source frequency. In effect, the rotating field "spins" at one-half or double the generally expected rate, in view of the number of magnetic poles provided by the stator and field winding construction. As a result, the rotating member of the motor (e.g., the squirrel cage rotor which is typical of most common induction motors) is "fooled" into rotating at a exceptional, radically different pseudosynchronous speed from that which is ordinarily available from the motor.

By using the term "pseudosynchronous", I refer to a motor's rotating member speed in RPM which is about one-half or double the usual synchronous speed of the motor, given a particular pole configuration (e.g., 2-pole, 4-pole, etc.). For example, a 2-pole motor operating from 60 (50) Hertz AC power usually runs near 3,600 (3,000) RPM, whereas a pseudosynchronous speed for a 2-pole motor may be about 1,800 (1,500) RPM or 7,200 (6,000) RPM.

1. HIGH SPEED OPERATION:

Applications abound which demand (or at least perform better with) higher operating speeds than the usual 3,450–3,600 (2,875–3,000) RPM maximum speed available from conventional 2-pole induction motors. Centrifugal pumps (for example water "jet" pumps used with wells, swimming pools and hot-tubs) benefit from faster impeller operation with the result that delivery rate or volume is increased and, more importantly, a substantial increases in "lift" or pressure may be obtained. The motor and pump may also be smaller in construction to obtain an equivalent performance level determined by delivery volume and lift capability.

Air blowers, and particularly the designs using "squirrel cage" impellers, show strong improvement in air moving capability when the "tip velocity" of the impeller is increased. It is also well known that, when working against substantial back pressures, the ability for a blower to markedly increase air flow is brought about by higher blower fan speeds. Conversely, a blower operating with higher impeller speed may be made substantially smaller in physical size relative with a given air moving volume capacity.

Running at "double speed", compressors used for refrigeration and air conditioning demonstrate surprisingly big improvements in compression capability and overall operating performance, coupled with space-saving physical size and weight reduction.

Appliances and machines requiring motor speeds higher than that which is available from ordinary 2-pole AC induction motors (i.e., about 3,450 RPM) usually resort to the use of "universal series wound" motors. Such motors are most commonly known in vacuum cleaners and a variety of hand-held power tools, such as portable electric drill, portable circular saws, power sanders, etc. In these applications, the universal series wound motor is typically engineered to operate at relatively high speeds, for example 4,500 RPM or faster. Universal series motors include a wound rotor (armature) having a commutator and brushes. Universal motors have short performance lifetimes, produce much acoustical and electrical noise, tend to be inefficient and run hot, and in general are more trouble prone. Universal motors are understood to seldom be a suitable choice for continuous duty operation applications.

In many everyday applications, such as refrigerator and air conditioner compressors, which might otherwise benefit from higher speed motor operation use of a universal motor is an utterly unsuitable choice by virtue of a short operating lifetime, relatively high noise level and presence of a commutator using brushes typical of this class of motor design.

Known also are "brushless DC motors" which may operate at higher speed than what is attainable with ordinary induction motors. A principal drawback to this class of motor design is the more costly motor construction, compared with the time-proven and cost-effective simplicity of ordinary squirrel cage induction motor design. Brushless motors may utilize electronic commutation of the rotor winding structure, resulting in a more expensive inclusion of active electronic circuitry within the confines of the rotor structure.

2. LOW SPEED OPERATION:

Lower than ordinary motor speed operation is desirable for many applications. Comfort control systems such as air conditioners, for example, often have fan (blower) motors which may run about 1,500 RPM using a 4-pole motor design, while operating from 60 Hertz AC power. Washing machines frequently have a slow-speed (i.e., "gentle cycle") mode, where the usual 4-pole 1,725 RPM motor operation is switched over to 6-pole 1,140 RPM operation (or even in some cases, to 8-pole 860 RPM operation). In a typical air conditioner fan motor application, a high-slip motor design, such as shaded pole motor, is ordinary used. High slip operation is feasible when driving a fan or blower, because the load is relatively constant for any speed and as a result, operational balance dictates that slip remains relatively constant. A typical motor rated for ⅕ horsepower is used in Rheem air conditioners (Part #51-20671-01) and the motor is designed to run about 1,075 RPM and is rated to draw 1.9 amperes from 230 volts AC (437 volt/amps). High slip operation of an induction motor is recognized to be very inefficient and wasteful of energy. As earlier mentioned, such motors exhibit high reluctance and poor loaded power factors and are mostly suitable for light loads or intermittent operation.

Even "properly" designed 6 or 8 pole motors operate with less than "best" efficiency. For example, a typical 825 RPM (8-pole) ⅕-hp motor used in Lennox air conditioners (General Electric Model 5KCP39PG3490S) draws 3.2 amperes from 230 volts AC (736 volt/amps) for operation. Construction of 6 and 8 pole motors is far more physically complex than the construction of common 2 and 4 pole motors. Therefore, it is advantageous that through using my teaching operationally equivalent low-speed performance of an 8-pole motor for example can now be obtained from an ordinary and mechanically simpler 4-pole motor implementation (i.e., 825 RPM operation).

Reduced frequency operation of a motor (e.g., 25 or 30 Hertz operation) generally reduces eddy current losses, result in a cooler motor. More importantly, the effectively lower frequency operation permits use of less-thin stator core laminations or laminations fabricated from a lower-quality level of silicon steel (transformer steel), with some attendant cost-saving. I do realize, however, that the winding inductance and the number of turns of wire must be proportionately increased, with a measurable increase in copper loss. However, I find that reduced eddy current losses may ordinarily more than offset increased copper loss.

Subfrequency motor operation which results in a slower parasynchronous motor speed operation enables a motor designer to improve the motor's intrinsic magnetic path efficiency through a smaller stator to rotor air-gap spacing combined with other factors involving how "deep" shorting bars appear to be imbedded into the rotor's core structure, thereby to make for a tighter magnetic design, lower effective reluctance and improved operational efficiency, including higher power factor operation under normal loading. In other words, the improved performance motor structure, which might result in too fast of output shaft rotational speed when run directly from the AC power source 60 (50) Hertz power prune line frequency can now provide a desired lower rate of output shaft rotational speed (RPM when operated from the subsynchronous AC power frequency. The total result is improved overall motor efficiency and stability. In brief, the same job is accomplished using less energy.

FIELD OF MY INVENTION

My invention pertains to induction motor dynamo-electric machines designed for operation from a source of alternating current electric power. In particular, my invention considers that field of induction motors having squirrel cage rotors which ordinarily produce rotation of an output member at a speed (in RPM) represented as approximately:

$$RPM = (PLF \times 120)/NP \qquad (2)$$

Where:
 RPM=Rotation Speed
 NP=Number of Field Poles

My invention more particularly relates to a change of the EFFECTIVE rate of cyclic alternation of the AC power frequency applied to the motor field terminals in order to obtain pseudosynchronous motor speed which makes exception to the output speed as ordinarily calculated in this basic prior-art formula. In other words, in the suprafrequency mode the AC Power virtual line frequency value VLF is increased to a value double that of the natural frequency of the AC power source. Conversely, in the subfrequency mode the AC Power virtual line frequency value VLF is decreased to a value not more than one-half that of the prime line frequency PLF of the AC power source.

The result of implementation of my teachings is a parasynchronous half-frequency or double-frequency excitation of the motor windings with a corresponding pseudosynchronous motor shaft speed. The motor shaft pseudosynchronous rotational speed may represent a reduction to about one-half the calculated synchronous speed, or step-up in delivered motor shaft member rotation speed to about double the calculated synchronous speed. This novel pseudosynchronous motor shaft speed is a factor which is unique to my teaching.

DESCRIPTION OF PRIOR ART

Prior art abounds with numerous motor categories which may be useful while operating from AC electric power, particularly so-called utility power or commercial power. These motors commonly fall into several fundamentally different groups, having distinctively engineered features and generally different application objectives.

My invention is directed to a category of AC dynamo-electric machines known and understood in the art as induction motors. Most broadly, this subcategorically includes synchronous and asynchronous designs. The asynchronous motor in the range of 1/10 horsepower to about 1 horsepower is believed to likely benefit most from my invention's teaching. This does not preclude my invention's applicability to motors of lesser or greater horsepower, should the application warrant its utilization.

Ordinary induction motors having squirrel cage rotors or the equivalent ordinarily run at a relatively fixed rotational speed which is determined by the field excitation frequency of the applied AC electric power. The engineer of the common induction motor rotational speed entails consideration of three principal factors in a descending order of importance:

1. Number of Effective Motor Poles,
2. Frequency of the AC power source, and
3. Intrinsic Slip Speed (or Slip Frequency)

with the result that most minimal-design 2-pole induction motors run between about 3,300–3,550 (2,750–2,960) RPM when operating from ordinary 60 (50) Hertz commercial AC electric power.

Prior art delivers numerous recipes for obtaining "non-standard" or variable motor speeds from the inherently fixed-speed induction motor. For example, plain-vanilla variable voltage control may be used. The variable effect may be provided by supplying the AC electric power through tapped transformer, utilizing the phase-variable effective voltage drop (actually average power drop) introduced by a control thyristor in series with the motor, or by providing several field winding taps on the motor which can be selected to serve to reduce the field excitation and resulting torque. When the motor terminal voltage or field excitation level is reduced to near or below its breakaway torque, the motor's internal slip dramatically increases, and the motor shaft speed appears to decrease as though under control of change in the applied voltage or field excitation level. This mode operates well with speed proportional (albeit not necessarily liner) loads, such as fans. The motor shaft speed slows down to a point where equilibrium is obtained as a tradeoff between fan blade air-moving torque requirement and available motor torque, established by the reduced level of motor voltage which is presently exciting the motor field. A classic form of old-fashioned motor design employing this sort of variable field excitation speed control is the common Casablanca style of "ceiling fan" in which a nearly extreme level of slip speed occurs between the synchronous rotating field speed which might be indicated by the motor's pole and excitation frequency relationship and actual output speed delivered to the typical 24–60 inch, 2 to 5 blade ceiling fan as a load. In this motor family, it is rather usual that the slip speed exceeds the output member rotational speed.

Documented by various prior art writings are induction motors that are also driven by inverters or converters which accept the usual 117 (220) volt, 60 (50) Hertz AC electric power, rectify it to a DC level, and reinstate it as a higher or lower virtual line frequency AC power which couples with and excites the motor field winding.

These long known power frequency changers usually rectify the incoming AC power into a DC level which is typically stored in a capacitor. The DC level is then chopped into a pseudo-alternating power level or converted AC level (hereinafter CAC) which can be utilized to operate an induction motor at whatever speed the rate the CAC frequency encourages. The CAC power waveform is most often "square wavish" in form and in some cases the duty factor of the "square wave" is varied to produce power or torque variation in the motor, whilst maintaining the CAC frequency and intrinsic running speed of the motor about constant.

Known even earlier are synchroverters which comprise a combination of a synchronous induction motor coupled with an alternator. Such cumbersome electrical frequency changer machines have in the past been used for conversion of line frequency 60 (50) Hertz electric power to 400 Hertz "aircraft power" frequency, or for conversion to 50 (60) Hertz as in the change "American" power frequency to a "European" power frequency (or vice-versa).

Prior art is utterly silent about a direct utilization of the incoming AC electric power waveform which is accomplished by fragmenting the AC power cycles into quadrants, distinctively paired half-cycles or clusters of quadrants or half-cycles of alternating bipolar-phasing obtained through programmed phasal inversion of portions of the incoming AC power cycles into an alternating train of power pulses providing a new cyclic polarity sense having an underlying frequency which is higher or lower than that of the prime line frequency of the incoming AC electric power.

3. ENERGY CONSERVATION:

Low power factor operation of an electric motor is well known to introduce energy losses into the electrical distribution infrastructure, as well as in the motor itself. The low power factor phenomenon of harmonic distortion of the AC waveform most commonly manifests itself in inductively reactive loads by a pronounced lag between the current phase relative with the voltage phase of a load. This is the principal appearance of low power factor in conventional high-reluctance electric induction motors when operating directly from an AC electric power line.

AC power rectification intrinsic with contemporary solid-state frequency converters, and ordinary phase-angle varied thyristor turn-on control of AC power are two major sources of high harmonic distortion in today's operation of electric motors running with electronic control to obtain non-synchronous speeds.

Ideal sinusoidal AC power waveforms do not contain harmonics. For example, a resistance heater or incandescent light bulb typically operates near unity power factor since the resistive nature of the heating element of light bulb filament presents negligible reactance (e.g., inductance or capacitance) to the power line. As a result, the voltage and current is maintained "in phase" in a wholly resistive load which is characteristic of a dissipative load such as the heater.

Motors are inductive loads and they are intended to be as non-dissipative as possible. As such, their current lags the voltage. While this lowered power factor is of less import in smallish (e.g., under 1-HP) or in intermittently-run motors used in domestic applications, it does waste energy.

More urgency of concern over energy loss surfaces when harmonic distortion is introduced through electronic control or utter abuse of a motor's operational characteristics. Total harmonic distortion (THD) is the dominant measurement factor for losses and fundamentally relates to power factor. Third and fifth harmonic distortion factors are usually the most objectionable. For example, a power factor of 70% represents a THD of 1.02 percent, while a power factor of 25% represents a THD of 3.87 percent. For other power factors, the THD may be calculated using the following computer programmette:

```
10 REM THDXPF.BAS                              Ver. 1.00
20 REM -------------------------------------
30 REM    GW-BASIC MS/DOS   (c)H. Weber 11/18/96
40 CLS
50 LOCATE 6
60 PRINT "Enter Power Factor in Percent:  ";
70 INPUT;PF
80     IF PF<1 OR PF>100 THEN 40
90     THD=SQR((1/((PF/100)^2))-1)
100 THDD=INT(THD*100)/100
110 PRINT:PRINT
120 PRINT "TOTAL Harmonic Distortion=";THDD;"Percent"
130 PRINT:PRINT
140 END
```

Energy can be saved by avoiding the AC to DC to AC conversion typical of frequency converters. Each of the AC to DC and the ensuing DC to AC conversion process steps introduces a substantial loss and substantial levels of overall inefficiency. More importantly, the rectification phase of the AC to DC step produces discontinuous charging and discharging of the storage capacitor, with substantial harmonic distortion introduced back into the AC power line. In this setting, the low power factor is leading (rather than lagging) due to the capacitive reactance proffered the AC power source by typical AC power rectification techniques.

The odd-harmonic components of power factor distortion, including all harmonic energy up to say about the 39-th harmonic, can lead to disruptive imbalance in electric power distribution infrastructure systems. Low power factor promotes inefficient AC power distribution and results in requirements for oversized capacity in the AC supply lines to supply the apparent power demand, rather than the actual work-effort power consumed by the motor.

My invention foregos the troublesome AC to DC rectification process and sets about to directly adapt the AC power waveform through an introduction of a clever subcyclic waveform switching pattern. The result in a synthesized pseudofrequency AC power waveform which directly drives an electric AC induction motor with subsynchronous or suprafrequency excitation. My invention also readily adapts to provide power for lighting ballasts and other devices which may benefit from the pseudofrequency operation.

SUMMARY

My invention produces a surprising pseudosynchronous rotor speed (e.g., about double speed or about half-speed) operation from ordinary induction motors of conventional construction. For example, basic 2-pole induction motors which here-to-fore have been restricted to merely running about 3,450 RPM from 60 Hertz power (2,875 RPM from 50 Hertz) may now readily produce about 1,725 (1,435) RPM in my invention's subsynchronous operating mode and 6,900 (5,850) RPM in my invention's suprasynchronous operating mode.

A magnetic field excited by an alternating current, such as the field winding structure in an induction motor, may be efficiently energized by a virtual-frequency AC power signal that is derived from a primary source of AC electric power (such as ordinary utility power) and modified to represent a power component frequency equalling twice that of the AC power source. The resulting magnetic field reverses direction twice as often as what conventional wisdom might expect, based upon the fundamental AC power frequency. For example, if 60 (50) Hertz AC power is utilized to excite an ordinary induction motor field winding, the magnetic flux in the motor stator structure alternatingly reverses NORTH/SOUTH polar direction 60 (50) times a second. The result of this 60 (50) Hertz polar field reversal is an induction of a "rotating flux field" within the motor stator core that acts upon the motor's rotor (usually of a squirrel cage construction) in the manner of a transformer primary winding (the field winding) opposingly coupled with a shorted turn transformer secondary winding (the rotor bars) to cause the motor's shaft to spin an approximate unison with the rotational "speed" of the flux field's virtual rotation. It is well known that if a motor has 2-poles (the least possible), the flux field (when excited by 60 Hertz AC power) produces a rotational speed in RPM which may be determined as:

$$60 \text{ Hz} \times (120/\text{NP}) = 60 \text{ Hz} \times (120/2) = 3{,}600 \text{ RPM} \qquad (3)$$

In practice, the rotor of the usual practical induction motor must exhibit some "slip" (e.g., difference in speed between the rotating flux field and the actual rotor speed). In my example, the shaft speed is likely about 3,400–3,550 RPM, depending upon conditions of immediate output shaft mechanical loading and intrinsic motor design characteristics.

Usual 60 (50) Hertz AC utility power appears as a sine wave power signal which, as is well known in the art, may be defined as having four successive 90-degree quadrants over the full 360-degree bi-polar power cycle. The instantaneous A or B phase polarity P1 of each quadrant may be conveniently expressed as:

TABLE 1

| 50/60 Hz. AC Electric Power | | | | | | | | |
|---|---|---|---|---|---|---|---|---|
| A.C. QUADRANT> | 1 | 2 | 3 | 4 | 1 | 2 | 3 | 4 | 1 ..etc. |
| (P1) POLARITY> | A | A | B | B | A | A | B | B | A ..etc. |
| Time –>>>> | |<-First-> Cycle | | | |<--Next--> Cycle | | | |<-Successive Cycles |

My instant invention shows a technique that enables a modification of the virtual waveform structure of the 60 (50)

Hertz AC power cycle frequency as applied to the motor's RUN winding to produce parasynchronous magnetic field excitation of the motor. I demonstrate how the apparent excitation frequency may be doubled to achieve higher rotational speeds and divided to reduce a motor's rotational speed.

1. SUPRASYNCHRONOUS OPERATION:

Applications for parasynchronous excitation of a motor abound where an exceptionally higher (suprasynchronous) motor speed is beneficial. In particular, the delivery performance of impellers used in centrifugal and "jet" water pumps show remarkable improvement with higher speed. Air blower impeller wheels and fans also show increases in air moving performance (particularly when "blowing" against significant backpressure) with increased speed.

Refrigeration and air conditioning "hermetic" motor/compressors units may now be more compact, and with reduced mass, may operate more quietly and efficiently. For a refrigerator application, a smaller hermetic motor/compressor unit size translates into an increased interior refrigerator cabinet space relative with a maintained exterior form factor.

I have been pleasantly surprised to find that, with but a modest amount of extraneous circuitry, I can adapt motors of seemingly ordinary construction to now run about double their here-to-fore known maximum speed capability with small sacrifice in electrical efficiency and with the promise of dramatically improved operational performance by many kinds of driven loads which are known to generally benefit from this increased rotational speed.

For electromotive machine manufacturers, the ability to obtain unique operating characteristics from an existing motor construction technique offers the saving of a retooling cost and the ability to continue to utilize existing manufacturing machines, processes and inventory resources, along with a present level of worker skills. Retrofit of production capabilities to make alternate motor forms (e.g., brushless motors, etc.) is often a formidable business decision from a "return on investment" point of view not merely from cost related to new production line equipment but also due to an increased level of worker skills which may require retraining or new hiring of manufacturing, test, quality control and applications engineering personnel, hence old processes are maintained sometimes to the detriment of the manufacturer. My invention's ability to continue to utilize the existent manufacturing capabilities obviously softens this economic impact on any maker.

The heart of my invention's suprasynchronous mode is to partition every AC power cycle into four successive quadrants (each having about 90 electrical degrees duration), and then to act upon each quadrant 1, 2, 3, and 4 in the sense of producing a successive quadrant-by-quadrant alternation of power flow as coupled to the motor windings. For example, in ordinary 60 (50) Hertz power, the AC power cycle might exhibit four quadrants, each having a duration T about:

$$T = ((1/F) \times 1000)/4 \quad (4)$$

where:

F=60 (50) Hertz or about 4.167 (5.0) milliseconds of duration.

Motors which heretofore have been restricted to a maximum operating speed of 3,450 (2,875) RPM from ordinary 60 (50) Hertz AC power may now achieve much higher speeds, readily producing about 6,900 (5,850) RPM. Applications abound where higher motor RPM is well known to be operationally beneficial, including centrifugal pumps, compressors and power tools.

Doubling the applied AC power frequency, or alternatively finding a method for producing twice as many field reversals per AC power source frequency cycle, induces a 7,200 (6,000) RPM rotating flux field rate, with the result that the motor's rotor may correspondingly rotate about 6,800–7,100 (5,667–5,916) RPM, allowing for nominal levels of slip thereby attaining the suprasynchronous mode of parasynchronous operation. I have been surprised to find that, with a modest amount of extraneous circuitry, I can adapt ordinary motor designs utilizing conventional prior-art construction techniques to now run about double their here-to-fore known speed capability with small sacrifice in electrical efficiency and with the unremitting promise of improved driven-load performance.

Doubling of the motor speed is accomplished in my invention by effectively doubling the 60 (50) Hertz AC power frequency to produce a 120 (100) Hertz virtual "suprafrequency" magnetic field excitation of the motor field windings. This results in an effective 120 (100) Hertz alternating rate of NORTH/SOUTH magnetic field reversals to appear in the motor's stator poles.

The immediate result of this increased magnetic field alternation rate is about double speed "suprasynchronous" operation from the motor, thereby enabling the motor to develop about 6,900 (5,750) RPM operation from a 2-pole induction motor construction which otherwise may ordinarily run about 3,450 (2,875) RPM from 60 (50) Hertz AC power. What my invention accomplishes in principle is to bring about alternation of the instantaneous virtual polarity of successive QUADRANTS of each AC power cycle as applied to the induction motor's field windings, resulting in an instantaneous phase polarity P2 for each quadrant as shown to be:

TABLE 2

| 50/60 Hz. AC Electric Power | | | | | | | | |
|---|---|---|---|---|---|---|---|---|
| A.C. QUADRANT> (P2) | 1 | 2 | 3 | 4 | 1 | 2 | 3 | 4 | 1 ..etc. |
| POLARITY> | A | B | A | B | A | B | A | B | A ..etc. |
| | <--First--> Cycle | | | | <--Next--> Cycle | | | | <--Successive Cycles |
| Time -->>>> | | | | | | | | | |

You will notice that the polarity is "twice reversing" during each cycle. The result is a suprafrequency doubling of the reversal of the motor's magnetic field polarities. Following the well known rules of induction motor operation, it is the magnetic field polar reversals which determine the motor's rotating flux field rate and resulting speed of rotor operation and therefore the rotor's speed is about doubled.

Imagine now that the motor is coupled with the AC power line through a DPDT "reversing" switch, arranged such that power is applied in a first direction when the switch is in position N (normal), while the power direction is reversed in position I (inverted). Replacing the reversing switch concept with semiconductor switches allows fast switch reversal, so fast in fact that it is possible to reverse the power direction near the midpoint of each AC power half-cycle. This results in the suprafrequency switching of intercyclic AC power direction quadrant-by-quadrant. A reversing switch may now be shown to have the following succession P3 of "directions" N (normal) or I (inverted) throughout each AC power half cycle.

TABLE 3

50/60 Hz. AC Electric Power

| A.C. QUADRANT> | 1 | 2 | 3 | 4 | 1 | 2 | 3 | 4 | 1 ..etc. |
|---|---|---|---|---|---|---|---|---|---|
| (P1) POLARITY> | A | B | A | B | A | B | A | B | A ..etc. |
| (P3) Polarity> | N | I | I | N | N | I | I | N | N ..etc. |
| (P2) Polarity> | A | B | A | B | A | B | A | B | A ..etc. |
| | |<-First-> Cycle | | | |<--Next--> Cycle | | | |<-Successive Cycles |
| Time -->>>> | | | | | | | | | |

As this chart shows, the result of combining the incoming AC power prime line frequency representation P1 with the instantaneous mid-quadrant reversing sequence pattern of motor connection P3 results in the virtual double frequency AC power alternation P2.

When the effective drive frequency for a motor's field is increased, the applied voltage must necessarily be proportionately increased to compensate for the resulting frequency dependent impedance increase. Since my invention effectively doubles the excitation frequency, the voltage applied to the motor's RUN winding needs to be about doubled. Said another way, the turns-per-volt or effective inductance of the motor winding must be decreased.

It is the novel teaching of my invention to now intentionally control the parasynchronous polarity sequence of the succession of AC power cycle quadrants. For example, to increase the frequency of field excitation for the motor, a twice as fast alternation of quadrants of AC power may be shown by:

+--+--=120 (100) Hz, 2 full cycles

Any waveform produced by mid-point polarity reversal switching of successive AC power half-cycles results in the first and third quadrant waveforms having a fast trailing edge, while the second and fourth quadrant waveforms have a fast leading edge.

I have therefore found it beneficial in a practicable sense and in view of the inductive nature of the motor winding load, to also manipulate the actual midpoint half-cycle switchover point by sometimes more than a few electrical degrees about the 90-degree (or 270-degree) half-cycle midpoints. This is to say that each of the four quadrants may be dynamically predetermined to have durations greater or less than exactly 90 electrical degrees in order to improve the motor's absolute operational characteristics. Furthermore, I realize that the dynamic redetermination of quadrant duration may be manipulated relative with motor loading or instant levels of power factor to obtain best operational balance as reflected back into the AC power source.

I have also found it beneficial to briefly delay turn-ON of the fast rise second and fourth quadrants until the fast trailing edge of quadrant one and three have been allowed to decay below a predetermined level and become electrically settled. Such non-symmetrical switching of the power cycle quadrants appear to produce improvements in motor efficiency and betterment of AC power factors. I have also found that a minor change in the construction of an induction motor can provide these superior results of increased motor operational speed with fewer control circuit elements. The change in motor construction which I have found merely involves winding the main RUN winding of the motor with two parallel windings, involving a technique which may readily be incorporated into existing motor manufacturing lines.

Early practice of my invention resulted in an arrangement of 8 semiconductor power switches which operate in concert to bring about the AC power coupled with the motor's run winding in quadrant alternation. I discovered that by utilizing this splitting of the motor's run winding into the aforementioned two distinctly separate counter-parallel wound windings each having about the same number of turns as a single winding, but wound with smaller wire (having about 50% the wire gage size) results in a motor which can be operated by control circuitry having only 4 semiconductor power switches.

I have also discovered that utilization of the two counter-parallel wound windings tends to "soften" switching transients associated with mid-halfcycle (e.g., 90 and 270 degree) switching of AC power polarity as applied to the motor's effective field winding. Probably this tendency for softening the switching occurs due to a finite, albeit small, amount of mutual inductance appearing between the two counter-wound field windings.

In one arrangement for such a dual counter-parallel RUN winding motor, AC power is coupled with the windings in the following arrangement.

TABLE 4

| RUN WINDING PORTION #1 | +Q1 | −Q4 | | |
|---|---|---|---|---|
| RUN WINDING PORTION #2 | | | +Q2 | −Q3 |
| MAGNETIC FIELD POLARITY | N | S | N | S |

Where:
$Q1 = 0 \leftrightarrow 89$ degrees
$Q2 = 90 \leftrightarrow 179$ degrees
$Q3 = 180 \leftrightarrow 269$ degrees
$Q4 = 270 \leftrightarrow 359$ degrees You will note that the relative sense of the magnetic field produced in the motor's field (e.g., stator structure) is shown to "reverse twice" during each AC power full cycle as a result of this novel arrangement. This forced alternation satisfies a fundamental goal of my invention which is to enable suprasynchronous operation of an induction motor from a source of ordinary AC power.

2. SUBSYNCHRONOUS OPERATION

Parasynchronous operation of the induction motor to reduce the induction motor's natural speed is accomplished in my invention be effectively dividing the 60 (50) Hertz AC power fundamental (base)frequency to produce virtual 30 (25) Hertz "subsynchronous" magnetic field excitation of the motor field windings. As a consequence, the magnetic field appearing at the stator poles appears to be alternatingly reversing in NORTH/SOUTH pole assignment at the subsynchronous 30 (25) Hertz rate. The immediate result or this effectively halved magnetic field pole alternation is about half speed operation from the motor, thereby delivering about 860 (750) RPM operation from a classic 4-pole induction motor which otherwise may ordinarily run about 1,725 (1,500) RPM from 60 (50) Hertz power.

What my invention does is to bring about a quadrupling of AC power cycle quadrants into like-polarity clusters equivalent to paired like-polarity half-cycles of AC power. Successive quadrant clusters alternate in polarity resulting in an instantaneous phase polarity P4 for each power cycle as shown to be:

TABLE 5

50/60 Hz. AC Electric Power

|  | First<br>k-- Cluster --> | | | | | | | | Second<br>k-- Cluster -->k-- | | | | | | | | | | |
|---|---|---|---|---|---|---|---|---|---|---|---|---|---|---|---|---|---|---|---|
| A.C. QUADRANT> | 1 | 2 | 3 | 4 | 1 | 2 | 3 | 4 | 1 | 2 | 3 | 4 | 1 | 2 | 3 | 4..etc. |
| (P1) POLARITY | A | A | B | B | A | A | B | B | A | A | B | B | A | A | B | B..etc. |
| (P4) POLARITY> | A | A | A | A | B | B | B | B | A | A | A | A | B | B | B | B..etc. |
|  | k-First-><br>AC Cycle | | | | k--Next-><br>AC Cycle | | | | k-Successive AC Cycles | | | | | | | |
| Time -->>>> | | | | | | | | | | | | | | | | |

The polarity of the AC power P4 which is applied to the motor field winding is shown to reverse during each successive AC power full cycle (e.g., the same polarity is maintained throughout four AC power quadrants, or two successive AC power half-cycles). The result is a subfrequency halving of the reversal of the motor's relative NORTH/SOUTH magnetic field polarities. The motor speed is therefore about halved.

Imagine now that the motor is coupled with the AC power line through the earlier mentioned high speed DPDT "reversing" switch arranged such that power is applied in a first direction when the switch is in position N, while the power direction is reversed in position I.

As is well known in the art, power semiconductor switching may be utilized to satisfy a fast switching sequence such as this, resulting in the subfrequency switching of virtual frequency AC power direction through the motor field winding having the following succession P5 of "directions" N (normal) or I (inverted) throughout each AC power cycle:

When the virtual drive frequency for a motor's field is decreased, the applied voltage must be decreased proportionately since the field winding impedance decreases with frequency for a given winding inductance. Since my invention effectively halves the excitation frequency, the voltage applied to the motor's RUN winding must be reduced. Said another way, the turns-per-volt or effective inductance of the motor winding must be increased.

The advantages of parasynchronous motor operation produced by subsynchronous power drive may be extended further than mere halving of the available AC power source prime line frequency PLF. For example, a division of the source frequency by 3 or 4 is practicable. The common two pole induction motor operating from PLF/3 virtual frequency may result in a pseudosynchronous shaft speed about 1,150 (960) RPM while operating from 60 (50) Hertz AC power. The PLF/3 virtual subfrequency switching of AC

TABLE 6

50/60 Hz. AC Electric Power

|  | First<br>k-- Cluster --> | | | | | | | | Second<br>k-- Cluster --> | | | | | | | | Third<br>k-- Cluster - | | | |
|---|---|---|---|---|---|---|---|---|---|---|---|---|---|---|---|---|---|---|---|---|
| A.C. QUADRANT> | 1 | 2 | 3 | 4 | 1 | 2 | 3 | 4 | 1 | 2 | 3 | 4 | 1 | 2 | 3 | 4 | 1 | 2 | 3 | 4..etc. |
| (P1) POLARITY | A | A | B | B | A | A | B | B | A | A | B | B | A | A | B | B | A | A | B | B..etc. |
| (P5) POLARITY | N | N | I | I | I | I | N | N | N | N | I | I | I | I | N | N | N | N | I | I..etc. |
| (P4) POLARITY> | A | A | A | A | B | B | B | B | A | A | A | A | B | B | B | B | A | A | A | A..etc. |
|  | k----First----><br>Virtual AC<br>Cycle | | | | | | | | k---Second---><br>Virtual AC<br>Cycle | | | | | | | | k----Next---<br>Virtual AC<br>Cycle | | | |
| Time -->>>> | | | | | | | | | | | | | | | | | | | | |

As this chart shows, the result of combining the incoming AC power frequency representation P1 with the instantaneous mid-phasal (e.g., 180 electrical degree) reversing sequence pattern of motor connection P5 results in the effectively one-half frequency AC power alternation P4.

power direction through the motor field winding to produce a magnetic field polarity P6 may be obtained through the following succession P7 of instantaneous intracyclic power flow "directions" N (normal) or I (inverted) throughout each AC power cycle:

TABLE 7

50/60 Hz. AC Electric Power

|  | First<br>k------ Cluster ------> | | | | | | | | | | | | Second<br>k----- Cluster - | | | | | |
|---|---|---|---|---|---|---|---|---|---|---|---|---|---|---|---|---|---|---|
| A.C. QUADRANT> | 1 | 2 | 3 | 4 | 1 | 2 | 3 | 4 | 1 | 2 | 3 | 4 | 1 | 2 | 3 | 4 | 1 | 2..etc. |
| (P1) POLARITY | A | A | B | B | A | A | B | B | A | A | B | B | A | A | B | B | A | A..etc. |
| (P7) POLARITY | N | N | I | I | N | N | I | I | N | N | I | I | N | N | I | I | N | N..etc. |
| (P6) POLARITY> | A | A | A | A | A | A | B | B | B | B | B | B | A | A | A | A | B | B..etc. |
|  | k----First Virtual----><br>Frequency AC Cycle | | | | | | | | | | | | k---- Second Virt<br>Frequency AC | | | | |
| Time -->>>> | | | | | | | | | | | | | | | | | | |

As this shows, the result of combining the incoming AC power frequency representation P1 with the instantaneous mid-phasal reversing sequence pattern of motor connection P7 results in the effectively one-third frequency AC power alternation P6.

When the drive frequency for a motor's field is decreased in this manner, the applied voltage must be decreased proportionately or the turns-per-volt (or inductance) of the motor winding must be increased.

Similarly, the common two pole motor operating from F/4 virtual frequency may result in a pseudosynchronous shaft speed about 862 (720) RPM while operation from 60 (50) Hertz AC power. The F/4 virtual 15 (12.5) Hertz subfrequency switching of AC power direction through the motor field winding to produce a magnetic field polarity P8 may be obtained through the following succession P9 of instantaneous intracyclic power flow "directions" N (normal) or I (inverted) throughout each AC power cycle:

with caution and suspicion. I realize that other physical embodiments involving different electrical hookups utilizing contemporary components may be preferable in view of the ever-improving field of electrical engineering. Merely exhibiting a difference in implementation detail from that which I depict is anticipated as a mere engineering choice which might be practiced by others. However, any such studied variation made as a exception from the shown physical embodiment's explicit details is well known, being understood as an exercised common practice by persons knowledgeable in the underlying art. My description of several practical embodiments is provided primarily as a conduit for understanding of the methodology of the invention and as such specific details of each exampled embodiment shall be construed as representative and therefore may find considerable variation in a practiced implementation. All such practical variations involving differing details of design implementation, irrespective of their extent, shall be found as obvious and unexceptional hindsight variations and

TABLE 8

50/60 Hz. AC Electric Power

| | First | | | | | | | | | | | | | | | Second | | |
|---|---|---|---|---|---|---|---|---|---|---|---|---|---|---|---|---|---|---|
| | |<-- Cluster -->| | | | | | | | | | | | | |<-- Cluster| | |
| A.C. QUADRANT> | 1 | 2 | 3 | 4 | 1 | 2 | 3 | 4 | 1 | 2 | 3 | 4 | 1 | 2 | 3 | 4 | 1 | 2 | 3..etc. |
| (P1) POLARITY | A | A | B | B | A | A | B | B | A | A | B | B | A | A | B | B | A | A | B..etc. |
| (P9) POLARITY | N | N | I | I | N | N | I | I | N | N | I | I | N | N | I | I | N | N | I..etc. |
| (P8) POLARITY> | A | A | A | A | A | A | A | A | B | B | B | B | B | B | B | B | A | A | A..etc. |
| | <---First Virtual Frequency---> | | | | | | | | | | | | | | | <--- Second | | |
| | AC Cycle | | | | | | | | | | | | | | | | | |
| Time -->>>> | | | | | | | | | | | | | | | | | | |

As this shows, the result of combining the incoming AC power frequency representation P1 with the instantaneous mid-phasal reversing sequence pattern of motor connection P9 results in the effectively one-fourth frequency of AC power alternation P8.

As mentioned, when the virtual drive frequency for a motor's field is decreased in this manner, the applied voltage must be substantially decreased or the turns-per-volt of the motor winding must be proportionately increased.

When the virtual excitation frequency (e.g., subsynchronous frequency) is reduced to an effective value of 20 or 15 Hertz (16.7 or 12.5 Hertz) a condition known in the art as "cogging" of the induction motor's operation may occur, with attendant vibration or noise. This cogging effect is ordinarily overcome through load inertia or supplemental load inertia such as a flywheel to smooth out the pulsations.

An artisan may reasonably be expected to extend my invention's fundamental principles to gain variation in results tailored to a specific application or purpose. It is not within the scope of my invention's teaching to explore technological minutiae but rather to show you how pseudosynchronous operation of electric induction motors may be obtained through application of parasynchronous frequency power derived from the AC waveform intrinsic of a common source of AC electric power.

I fully anticipate and even expect that a skilled artisan may develop the details of my invention's implementation with considerable variation regarding motor selection, drive circuitry hookup, electrical and mechanical hardware details, and even operational preferences. Such alternate schemes result from mere engineering skill coupled with the plethora of parts and components which might be utilized to construct contemporary apparatus according to the underlying method and system teachings of my invention.

Any hindsight attempt by another to circumvent the essence of my invention in producing pseudofrequency operation of the induction motor shall be prudently viewed to be irrefutably within the scope of my invention as I have herewithin comprehensively taught and claimed.

OBJECTIVES

My invention includes numerous objectives a partial listing of which provides that:

A fundamental objective of my invention is to enable parasynchronous shaft speed operation of an induction motor obtained from a source of ordinary AC electric power.

Another objective for my invention is to provide a pseudosynchronous frequency of magnetic field alternation in the motor which is directly derived from the frequency of the AC power source.

A further objective for my invention is to provide the pseudosynchronous frequency as an increase in the magnetic field alternation rate obtained in the motor through controlled coupling of the individual quadrants of each AC power cycle so as to obtain quadrant alternation resulting in electrical excitation of the motor's field windings with power having twice the virtual frequency of the AC power source.

Yet another objective for my invention is to provide the pseudosynchronous frequency as a decrease in the magnetic field alternation rate obtained in the motor through controlled coupling of the individual half-cycle quadrant pairs of each AC power cycle so as to obtain alternating clusters of at least four quadrants resulting in electrical excitation of the motor's field windings with a virtual AC power subsynchronous frequency fractionally derived from the AC power source.

An important objective for my invention is to obtain a pseudosynchronous frequency of field excitation in an induction motor without the inefficiencies and additional complexities of here-to-fore known converters and inverters.

Still another objective of my invention is to show how an induction motor may be made with two RUN windings each of which are selectively switched on and off and thereby separately excited in a predetermined sequence from successive quadrants of each AC power cycle to obtain induction of a pseudosynchronous rate of magnetic field polar alternation in the motor's field pole structure.

Another objective for my invention is to show how an induction motor may operate with a shaft rotational rate representing a near parasynchronous speed by uniquely coupling a predeterminately switched pattern of AC power cycle quadrants of AC electric source power to the induction motor's field windings.

Yet another objective of my invention is to provide optimumal suprafrequency electrical efficiency through determining an extent of non-concurrency of timing of sequential switchover events established to occur between the first and third quadrant power turn-OFF and the corresponding second and fourth quadrant power turn-ON.

Another objective of my invention is to show a bifilar field winding construction which enables pseudosynchronous frequency of field excitation switching utilizing a reduced count of AC quadrant power switching elements.

These and other advantages of my invention will now be revealed to the skilled artisan, and it is anticipated that applications for and ways of using the elements of my invention will vary from those which are particularly shown, since my examples are given merely for the illustrative purpose of providing a clear understanding of the underlying essence of my invention. Such broader application of my invention's teachings to benefit other commonplace usages where an induction motor having an exceptional parasynchronous speed might replace other kinds of motors (such as the so-called "universal" series motor) shall be deemed to be obvious to any practicing artisan and within the general scope of my invention's reading.

DESCRIPTION OF DRAWINGS

My invention is depicted on 12 sheets of drawings including 12 illustrative figures.

DESCRIPTION OF INVENTION

Figure 1:
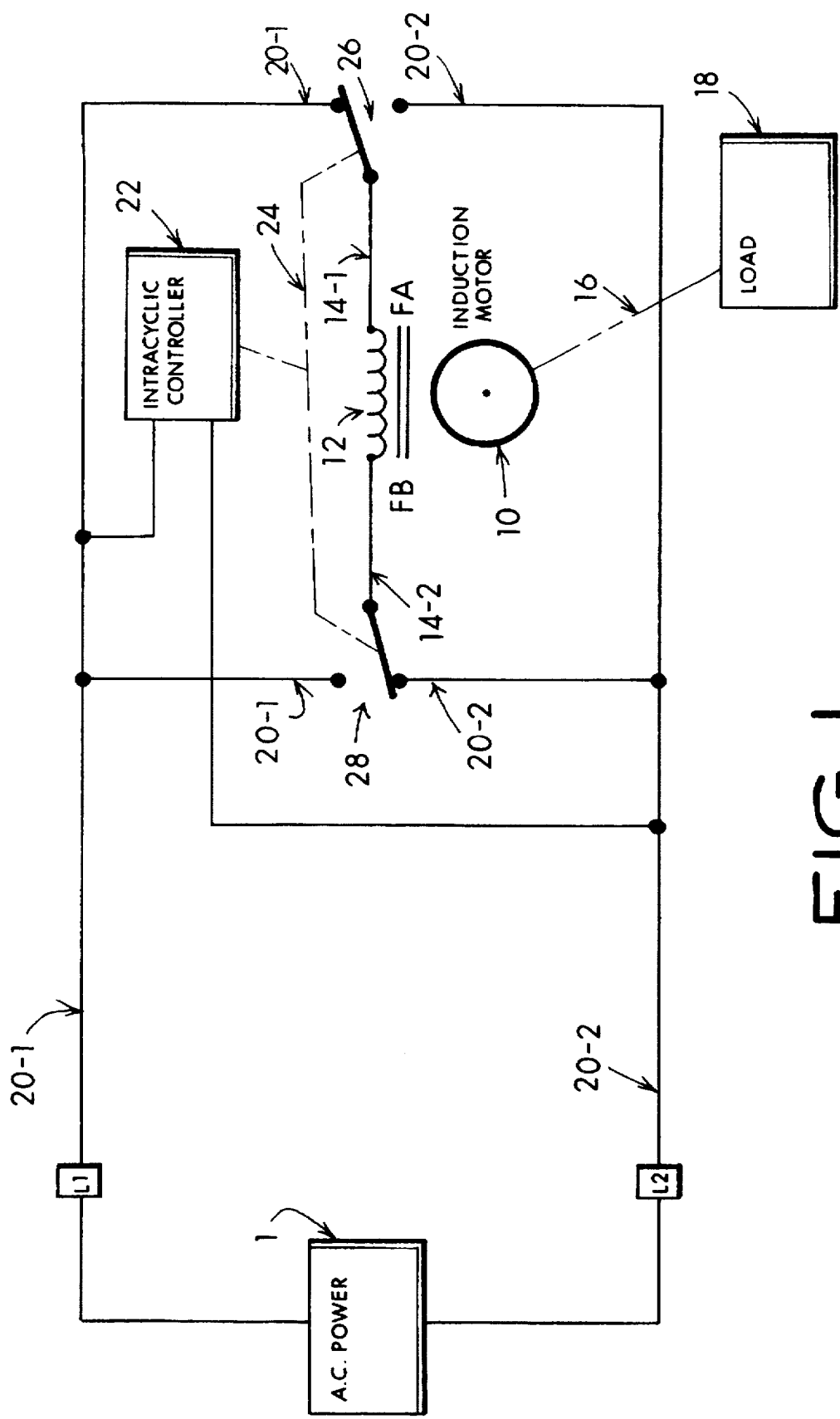
FIG. 1—Essence of invention is taught in elementary circuit.

In FIG. 1 I show a functional circuit which helps illustrate the underlying principle for obtaining my invention's novel parasynchronous operation. A source of alternating current (AC) electric power 1 couples with a field winding 12 of a dynamo electric machine, commonly described as an induction motor. The magnetic field produced by the field winding 12 induces a rotor 10 to spin, driving 16 a load 18. AC power from the source 1 couples via lines 20-1,20-2 to a pair of "double throw" switching devices 26,28. Although I depict what at first appears to be mechanical switches, in my invention's practice these virtual switching mechanisms 26,28 are necessarily arrangements of semiconductor devices, such as a MOS-FET (type of transistor) or a thyristor, because the switching speed must be far greater than that which can be obtained with mechanical switch contacts. Understand therefore that I use the illustrative example of the "double throw" switch contact mechanism merely to discuss the overall sequentiality of my invention's operation. The common contact of the switch 26 couples via line 14-1 with one end of the field winding 12. Similarly, the common contact of switch 28 couples via line 14-2 with the other end of the field winding 12. For purpose of this discussion, let "forward" current flow through the field winding be represented when line 14-1 is positive relative with line 14-2, whilst "reverse" current flow is represented when line 14-1 is negative relative with line 14-2. As is well known, one direction of current flow through the field produces a NORTH to SOUTH polar sense in the field structure, whilst an opposite direction of current flow through the field produces a reversed SOUTH to NORTH polar sense in the field structure.

AC power from the source delivers alternating bipolar power on lines 20-1, 20-2 (typically utilizing terminals L1,L2). When line 20-1 is POSITIVE relative with a NEGATIVE level on line 20-2, and with the switch contacts positioned as shown in the figure, current will flow through the field coil 12 with the line 14-1 POSITIVE and the line 14-2 NEGATIVE. This may result in a NORTH magnetic polarity sense being produced on the field's FA end, while a SOUTH polarity sense appears on the field's FB end. Nextly, the virtual switches 26,28 switch-over, with line 14-1 switched to line 20-2, and line 14-2 switched to line 20-1. With a same electric polarity sense of line 20-1 POSITIVE and line 20-2 NEGATIVE, this immediately results in a reversal of current flow through the field winding 12 resulting in a reversal of field polarity sense. Hence, a SOUTH magnetic polarity sense is produced on the field's FA end, whilst a NORTH polarity sense develops on the field's FB end. Extending these polarity sense and switching assumptions, a table of switching relationships may be developed as:

TABLE 9

| Electric Polarity Applied AC Power | Switch 20-1 | Switch 20-2 | Field Polarity Sense FA to FB |
|---|---|---|---|
| Line 20-1 (L1) POSITIVE relative with line 20-2 | 14-1 to 20-1 | 14-2 to 20-2 | NORTH to SOUTH |
|  | 14-1 to 20-2 | 14-2 to 20-1 | SOUTH to NORTH |
| Line 20-2 (L1) NEGATIVE relative with Line 20-2 | 14-1 to 20-1 | 14-2 to 20-2 | SOUTH to NORTH |
|  | 14-1 to 20-2 | 14-2 to 20-1 | NORTH to SOUTH |

The result of this switching action is to induce an alternating NORTH to SOUTH relationship between the field poles which translates into a virtual field reversal rate acting upon the motor's rotor 10 which may bring the rotor up to a parasynchronous rate of rotation. In other words. if the virtual magnetic pole switching rate occurs at a suprafrequency rate about double that of the applied AC line frequency the rotor may spin at a higher rate of speed approaching about twice that which heretofore has been known to have been produced through substantially direct utilization of the AC line frequency in combination with a conventionally engineered 2-pole induction motor. Conversely, if the virtual magnetic pole switching rate occurs at a subfrequency rate about half that of the applied AC line frequency, the rotor may spin at a lower rate of speed about one half that which heretofore has been produced through direct utilization of the AC line frequency in combination with an induction motor having a predeterminately engineered number of field poles.

Figure 2:
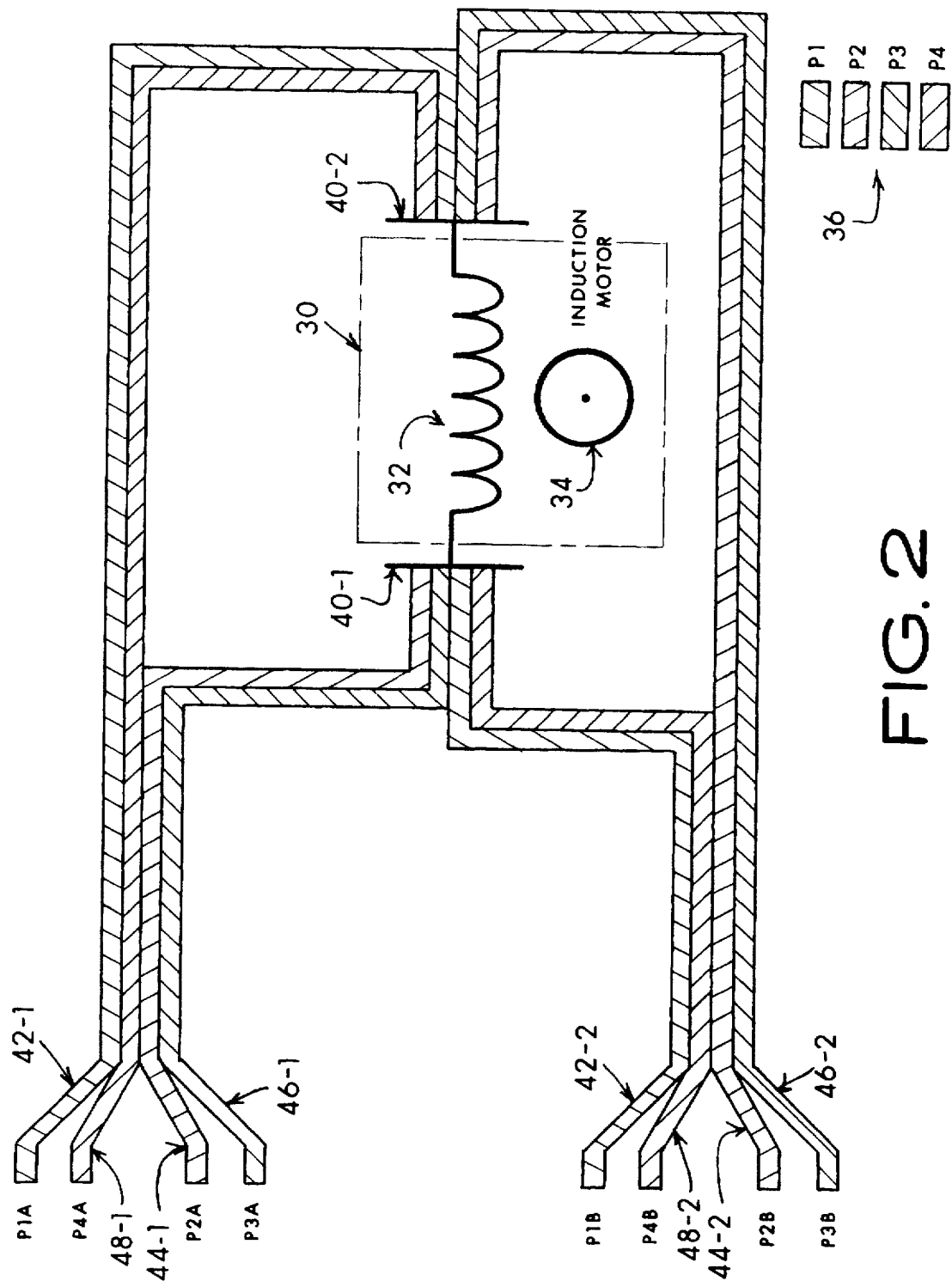
FIG. 2—Multi-path current flow through different quadrant portions of AC power cycle for single field winding induction motor.

In FIG. 2 I depict that phase (or polarity sense) switching of electric power flow through an induction motor 30 field winding 32. This embodiment suggest utilization of an effectively single field winding construction 32 acting upon a rotor 34 to produce rotation of an output member which might be utilized to drive a load, such as load 18 of FIG. 1. A key 36 of phase P1,P2,P3,P4 relationships is utilized to trace electric flow through the four principal path directions.

SINGLE FIELD WINDING PARASYNCHRONOUS OPERATION

Utilizing a cluster of 8 quadrants (e.g.. 2 full cycles) of the prime AC electric power and directing the biquadrantal flow of electric power through the motor may result in the following conditions of electric flow through the circuitous arrangement of FIG. 2.

connections 40-1,40-2 to satisfy the NORTH and SOUTH magnetic polar relationship induced in the field when operated with the indicated subsynchronous MODE I quadrantal excitation phasings of C0Q1 through C1Q4. For example, the C0Q1 quadrant couples through a path 42-1,42-2 between terminals P1A,P1B. This might be phased to produce a NORTH pole near the terminal 40-1 end of the field winding 32. In contrast, the C0Q3 quadrant couples through a path 44-1 between terminals P2A,P2B. This instead may produce a SOUTH pole near the terminal 40-1 end of the field winding 32. With this arrangement as depicted in the MODE I chart, the field magnetic pole alternates with a virtual subfrequency periodicity and the result is that the rotor 34 spins at a slower than "natural" rate and ordinarily about "half speed" for a given number of field poles. For example, this arrangement may provide nearly 900 RPM rotor speed using a 4-pole induction motor operating from common 60-Hertz electric power.

TABLE 11

| Current Path | MODE II - SUPRASYNCHRONOUS operation: | | | | | | | |
|---|---|---|---|---|---|---|---|---|
| | Quadrantal Coupling | | | | | | | |
| | C0Q1 | C0Q2 | C0Q3 | C0Q4 | C1Q1 | C1Q2 | C1Q3 | C1Q4 |
| P1A/P1B | +/– | | | | +/– | | | |
| P2A/P2B | | +/– | | | | +/– | | |
| P3A/P3B | | | +/– | | | | +/– | |
| P4A/P4B | | | | +/– | | | | +/– |

When the single field winding 32 of FIG. 2 is operated with the indicated suprasynchronous MODE II quadrantal excitation phasings of C0Q1 through C1Q4. For example, the C0Q1 quadrant couples through a path 42-1,42-2 between terminals P1A,P1B. This might be phased to produce a NORTH pole near the terminal 40-1 end of the field winding 32. In contrast, the C0Q2 quadrant couples through a path 44-1 between terminals P2A,P2B. This instead may produce a SOUTH pole near the terminal 40-1 end of the field winding 32. With this arrangement as depicted in the MODE II chart, the field magnetic pole alternates with a virtual subfrequency periodicity and the result is that the rotor 34 spins at a faster than "natural" rate, ordinarily about "double speed" for a given number of field poles. For example, this arrangement may provide nearly 7,200 RPM rotor speed using a 2-pole induction motor operating from common 60-Hertz electric power.

Figure 3:
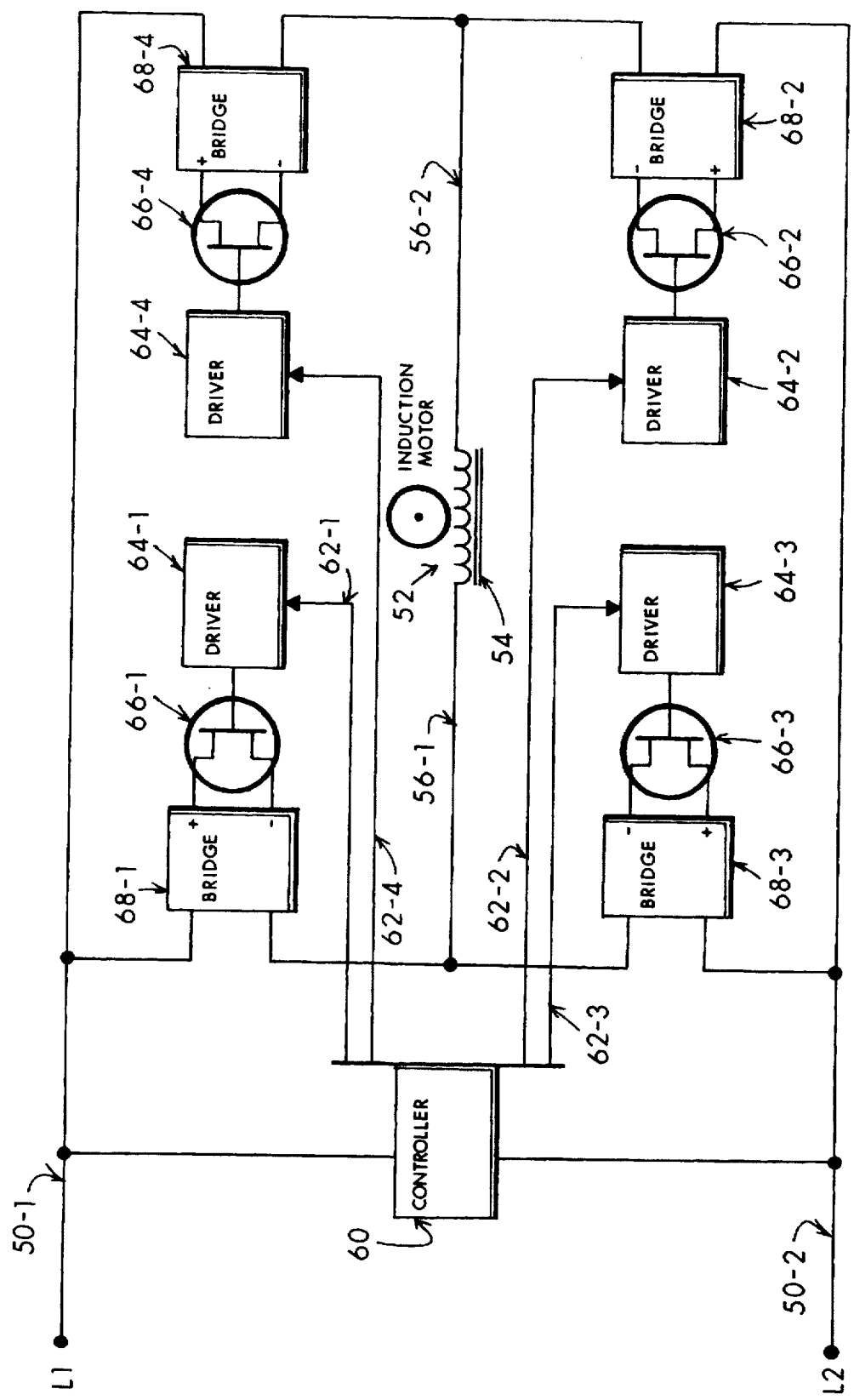
FIG. 3—Power switching circuitry for single field winding induction motor.

A suitable switching arrangement for a single field winding motor 52 appears in FIG. 3. AC electric power is

TABLE 10

| Current Path | MODE I - SUBSYNCHRONOUS operation: | | | | | | | |
|---|---|---|---|---|---|---|---|---|
| | Quadrantal Coupling | | | | | | | |
| | C0Q1 | C0Q2 | C0Q3 | C0Q4 | C1Q1 | C1Q2 | C1Q3 | C1Q4 |
| P1A/P1B | +/– | | | | +/– | | | |
| P2A/P2B | | +/– | | | | +/– | | |
| P3A/P3B | | | +/– | | | | +/– | |
| P4A/P4B | | +/– | | | | +/– | | |

AC power depicted in clusters of 2 full cycles consisting of 4 half cycles and 8 quadrants, identified as:
Cluster 0, Quadrants 1–4 = C0Q1 through C0Q4
Cluster 1, Quadrants 1–4 = C1Q1 through C1Q4
NOTE: +/– means that P1A is + and P1B is –, etc.

The paths P1–P4 through the motor field winding are shown to be phased relative with the winding 32 end provided on lines 50-1,50-2. Typically, the frequency is 60-Hertz in the United States. A controller 60 provides several control signals 62-1,62-2,62-3,62-4 which are patterned to provide the MODE I or MODE II switching shown in the preceding TABLES 10 and 11. Each of these signal lines couple with a respective driver 64-1,64-2,64-3,64-4. It is the object of the driver to convert the control signals into ON/OFF gating signals for a MOS-FET device 66-1,66-2, 66-3,66-4 (metal oxide semiconductor field effect transistor) having a drain and source connection coupled with the usual "output" or (+ and −) DC side of a bridge rectifier device 68-1,68-2,68-3,68-4. In this arrangement, two opposite MOS-FET devices are usually turned-ON at any given instant, following this table:

TABLE 12

| MOS-FET DEVICE | FLOW PATH 1 | FLOW PATH 2 | FLOW PATH 3 | FLOW PATH 4 |
|---|---|---|---|---|
| 66-1 | ON | ON | OFF | OFF |
| 66-2 | ON | ON | OFF | OFF |
| 66-3 | OFF | OFF | ON | ON |
| 66-4 | OFF | OFF | ON | ON |

As is well known in the art, a unilateral device such as a transistor connected across the DC legs of a bridge rectifier makes the combination of the transistor and bridge rectifier "look like" a bilateral thyristor when the bridge rectifier's input legs (AC legs) are connected in series between a source of AC power and an AC load. The result of this hookup is that the field winding connections 56-1,56-2 are separately connected with each of the AC power lines 50-1,50-2 in a quadrantally controlled sequence.

DUAL FIELD WINDING PARASYNCHRONOUS OPERATION

Figure 4:
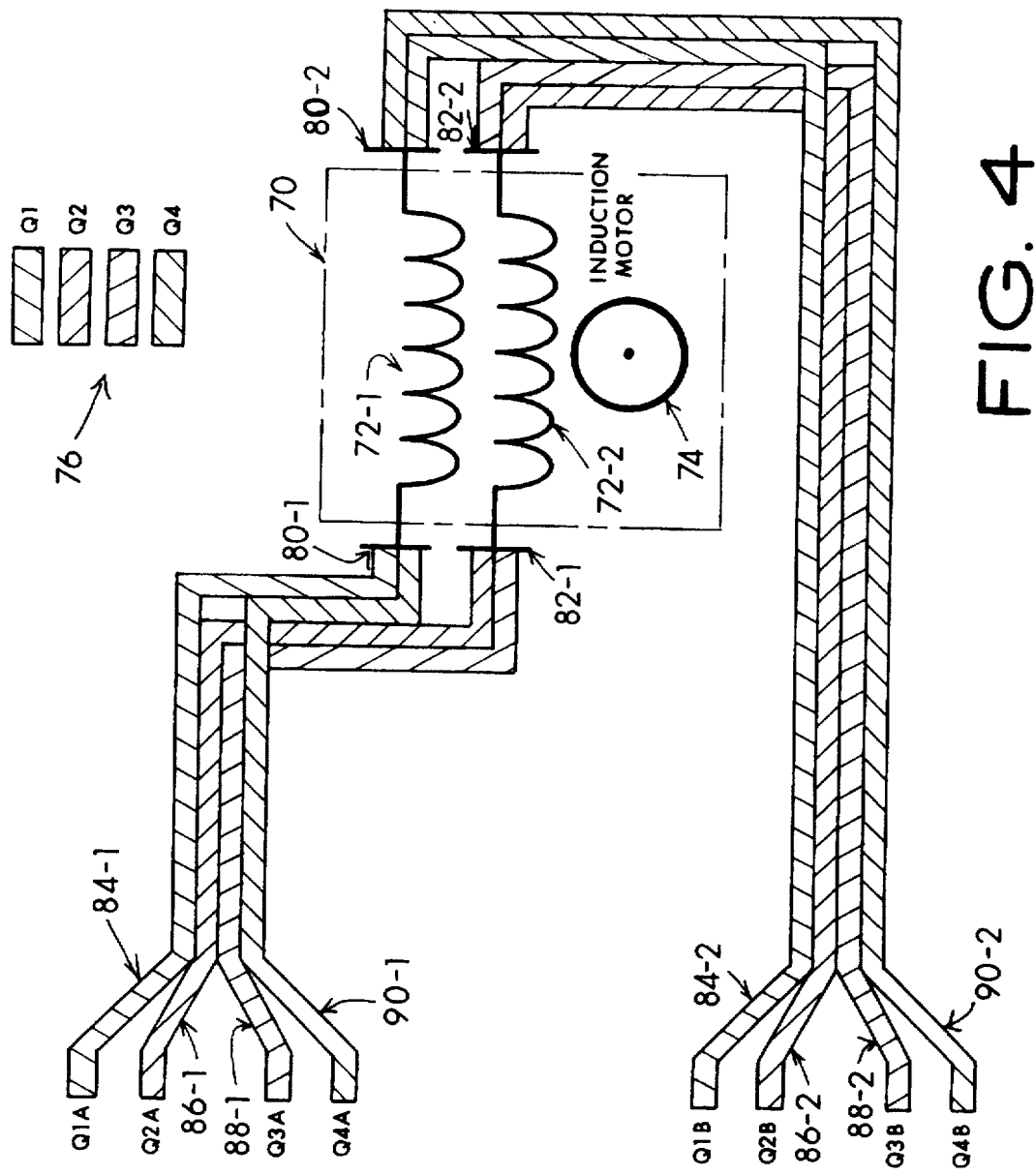
FIG. 4—Multi-path current flow through different quadrant portions of AC power cycle for double field winding induction motor.

In FIG. 4 I depict the phase (or polarity sense) switching of electric power flow through an induction motor 70 having a pair of field windings 72-1,72-2. This embodiment suggests utilization of two separate field windings 72-1,72-2 with the field construction acting upon a rotor 74 to produce rotation of an output member which might be utilized to drive a load, such as load 18 of FIG. 1. A key 76 of circuit phase Q1,Q2,Q3,Q4 relationships is utilized to aid tracing of electric flow through the four principal path directions.

Utilizing a cluster of 8 quadrants (e.g., 2 full cycles) of the prime AC electric power and directing the quadrant by quadrant flow of electric power through the motor may result in the following conditions of electric flow through the circuitous arrangement of FIG. 4.

TABLE 13

MODE I - SUBSYNCHRONOUS operation

| Current Path | AC Power Quadrant | | | | | | | |
|---|---|---|---|---|---|---|---|---|
| | Q1 | Q2 | Q3 | Q4 | Q5 | Q6 | Q7 | Q8 |
| Q1A/Q1B | +/− | | | | +/− | | | |
| Q2A/Q2B | | +/− | | | | +/− | | |
| Q3A/Q3B | | | +/− | | | | +/− | |
| Q4A/Q4B | | +/− | | | | +/− | | |

AC power depicted in clusters of 2 full cycles each consisting of 4 half cycles with 8 quadrants, identified as: Cluster 0, Quadrants 1–8 = Q1 through Q8
NOTE: +/− means that Q1A is + and Q1B is −, etc.

The paths Q1A–Q4B through the motor field winding are shown to be phased relative with the winding 72 end connections 80-1,80-2,82-1,82-2 to satisfy a necessary NORTH and SOUTH magnetic polar relationship induced in the field when operated with the indicated subsynchronous MODE I quadrantal excitation phasings of Q1 through Q8. Furthermore, the winding sense of the field winding 72-1 is engineered to be in polar opposition to the winding sense of the other field winding 72-2. The Q1 quadrant couples through a path 84-1,84-2 between terminals Q1A,Q1B. The field winding 72-1 might be phased to produce a NORTH pole near the terminal 80-1 end of the field winding 72. In contrast, the Q3 quadrant couples through a path 88-1,88-2 between terminals Q3A,Q3B. This instead may induce a SOUTH pole near the terminal 80-1 end of the field winding 72-1. With this arrangement as depicted in the MODE I chart, the field magnetic pole alternates with a virtual subfrequency periodicity and the result is that the rotor 74 spins at a slower than "natural" rate and ordinarily about "half speed" for a given number of field poles. For example, this arrangement may provide nearly 900 RPM rotor speed using a 4-pole induction motor operating from common 60-Hertz electric power.

TABLE 14

MODE II - SUPRASYNCHRONOUS operation:

| Current Path | Quadrantal Coupling | | | | | | | |
|---|---|---|---|---|---|---|---|---|
| | C0Q1 | C0Q2 | C0Q3 | C0Q4 | C1Q1 | C1Q2 | C1Q3 | C1Q4 |
| P1A/P1B | +/− | | | | +/− | | | |
| P2A/P2B | | +/− | | | | +/− | | |
| P3A/P3B | | | +/− | | | | +/− | |
| P4A/P4B | | | | +/− | | | | +/− |

When the dual field winding 72-1,72-2 of FIG. 4 is operated with the indicated suprasynchronous MODE II quadrantal excitation phasings of Q1 through Q8. For example, the Q1 quadrant couples through a path 84-1,84-2 between terminals Q1A,Q1B. This might be phased to induce a NORTH pole near the terminal 80-1 end of the field winding 72-1. In contrast, the Q2 quadrant couples through a path 86-1 between terminals Q2A,Q2B. This instead may produce a SOUTH pole near the terminal 80-1 end of the field winding 72. With this arrangement as depicted in the MODE II chart, the field magnetic pole alternates with a virtual subfrequency periodicity and the result is that the rotor 74 spins at a faster than "natural" rate, ordinarily about "double speed" for a given number of field poles. For example, this arrangement may provide nearly 7,200 RPM rotor speed using a 2-pole induction motor operating from common 60-Hertz electric power.

Figure 5:
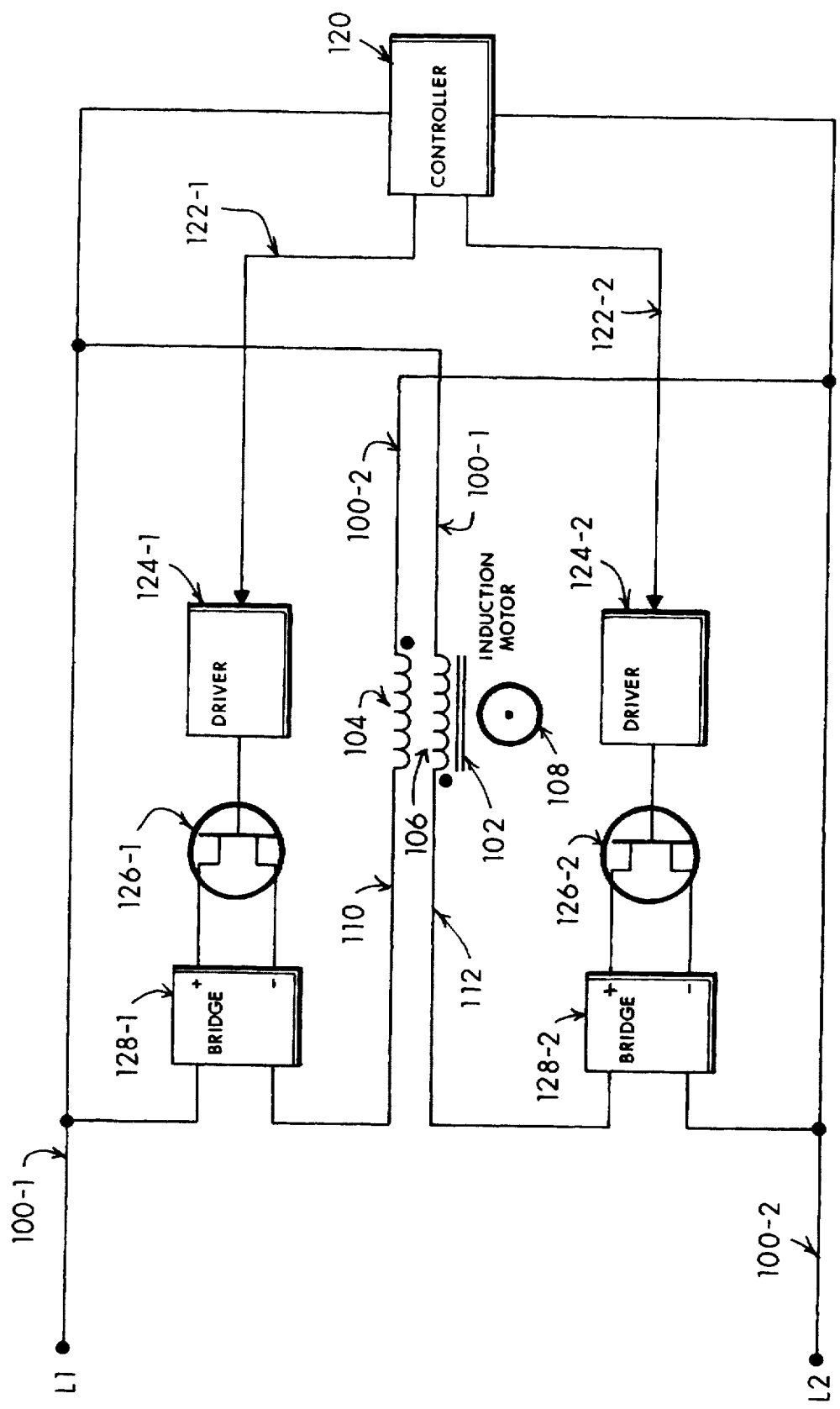
FIG. 5—Power switching circuitry for double field winding induction motor.

A suitable switching arrangement for an induction motor 102 having dual field windings 104,106 appears in FIG. 5. AC electric power is provided on lines 100-1,100-2. Typically, the frequency is 60-Hertz in the United States. A controller 120 typically provides two control signals 122-1, 122-2 which are patterned to provide the MODE I or MODE II switching shown in the preceding TABLES 3 and 4. Each of these signal lines couple with a respective driver 124-1, 124-2. It is the object of the driver to convert the control signals into ON/OFF gating signals for a MOS-FET device 126-1,126-2 having a drain and source connection coupled with the usual "output" or (+ and −) DC side of a bridge rectifier device 128-1,128-2. In this arrangement, a single MOS-FET devices is usually turned-ON at any given instant, following this table:

TABLE 15

| MOS-FET DEVICE | FLOW PATH 1 | FLOW PATH 2 | FLOW PATH 3 | FLOW PATH 4 |
|---|---|---|---|---|
| 126-1 | ON | OFF | OFF | ON |
| 126-2 | OFF | ON | ON | OFF |

The result of this hookup is that the field windings 104,106 are separately connected with each of the AC power lines 100-1,100-2 in a quadrantally controlled sequence.

Figure 6:
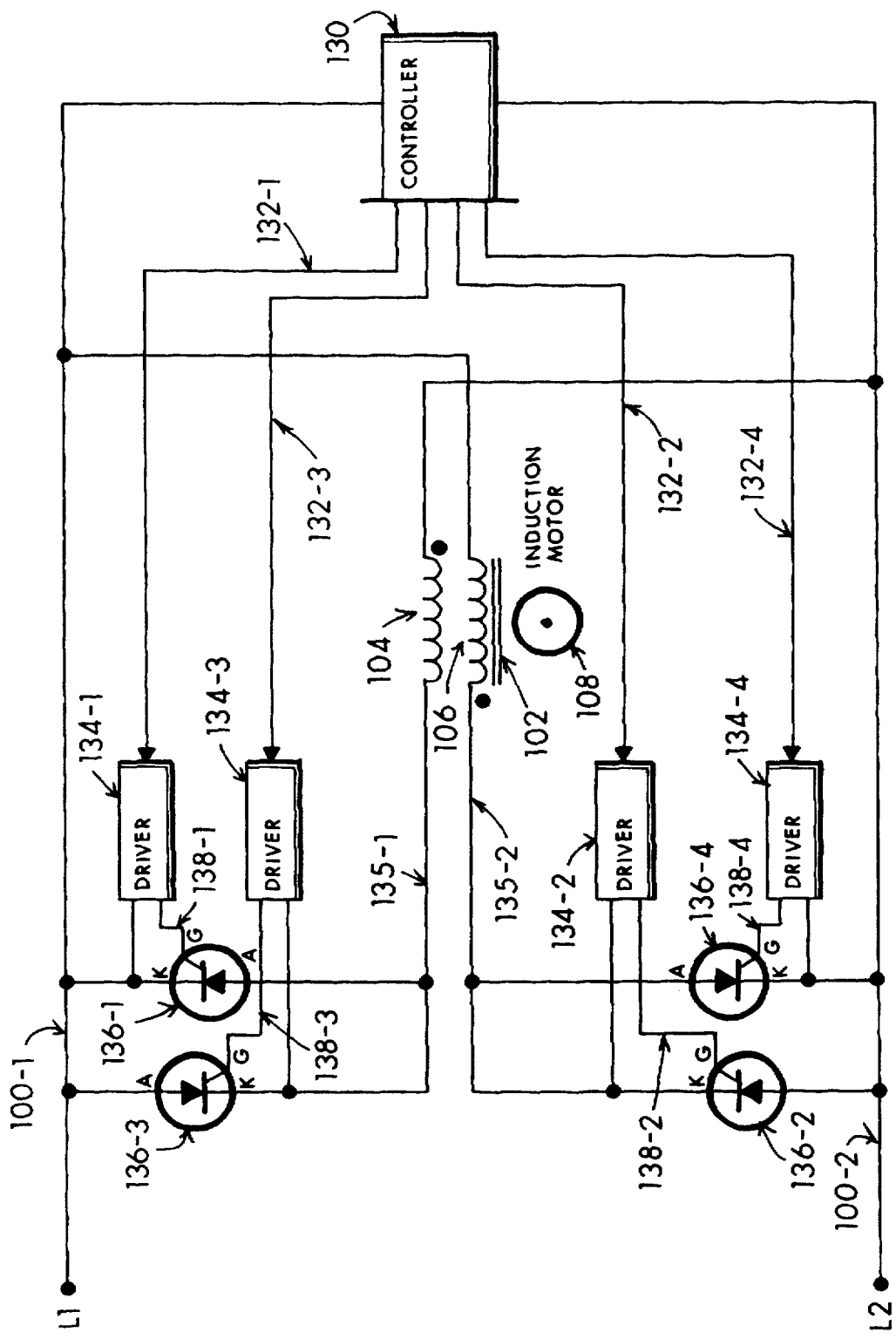
FIG. 6—Power switching circuitry for double field winding induction motor utilizing thyristor switch elements.

A controller utilizing thyristors of the silicon controlled rectifier (SCR) class is depicted in FIG. 6. A controller 130 delivers a pattern of gating signals on lines 132-1,132-2, 132-3,132-4 to drivers 134-1,134-2,134-3,134-4. This inventor has oftimes triggered SCR thyristors of the class suitable for this hookup utilizing standard optocouplers such as an QT-Optoelectronics (GE.) type H11C3 device. No explicit SCR triggering detail is shown, for this inventor realizes that such interface circuitry is a well known art.

The field winding 104 includes one end coupled with the AC electric power line 100-2 whilst the other winding end 135-1 couples with the anode of the SCR 136-1 and the cathode of the SCR 136-3. Likewise, the cathode of SCR 136-1 and the anode of SCR 136-3 couples with the AC line 100-1. This arrangement of the SCR devices 136-1,136-3 is oftimes defined as an inverse parallel connection. However, in my embodiment, each SCR is separately triggerable at a different portion of the AC electric power cycle appearing between terminals L1,L2.

The field winding 106 includes one end coupled with the AC electric power line 100-1 whilst the other winding end 135-2 couples with the cathode of the SCR 136-2 and the anode of the SCR 136-4. Likewise, the anode of SCR 136-2 and the cathode of SCR 136-4 couples with the AC line 100-2. SCR switched excitation of the field windings 102, 104 results in a parasynchronous induction of a rotational field in the rotor 108 produced by the virtual frequency alternation of the NORTH and SOUTH polar relationship of induced magnetic fields.

Figure 7:
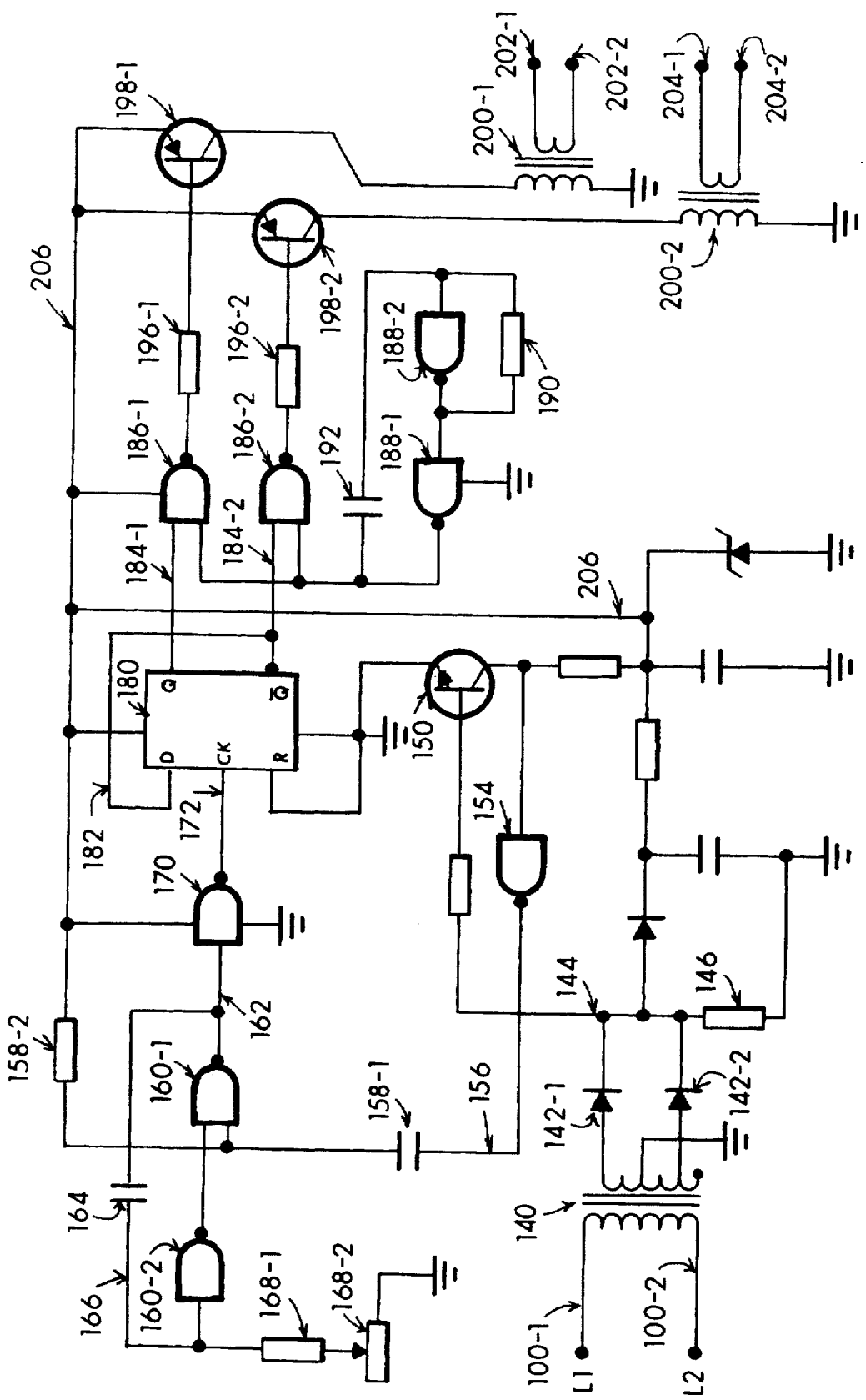
FIG. 7—Subsynchronous controller circuitry.

In order to develop a subfrequency pattern of switching signals a controller similar to that shown in FIG. 7 is useful. AC electric power brought in on lines 100-1,100-2 couples through a power transformer 140. The fullwave secondary couples with a pair of rectifiers 142-1,142-2 with a double-frequency pulse developed at the rectifier juncture 144. A swamping resistor 146 assures drainoff of residual leakage charges producing a pulsating positive pulse waveform which drops to zero level about each AC power half-cycle crossover. The result is a pulsation which occurs about 120 Hertz when the AC power source is 60 Hertz. This pulse couples with the base of an NPN transistor 150. The transistor's collector is coupled with the +DC power line 206 through a resistor. As a result of the gate pulsation, a spike-like positive-going pulse appears at the input of an inverter 154. The inverted, negative going pulse on line 156 couples through a differentiator including a capacitor 158-1 and resistor 158-2 to an input of NAND gate 160-1. This NAND gate, together with another gate 160-2 builds the active elements of a one-shot multivibrator. The negative spike pulse on the NAND gate 160-1 input delivers a positive pulse on line 162 which couples through a timing capacitor 164 appearing on line 166 at the input of the gate 160-2. Resistors 168-1,168-2 determine the capacitor 164 discharge time. During the period when the positive level on line 166 is held HIGH, the output of gate 160-2 as coupled with another input of gate 160-1 is held LOW. As a result the level on line 162 is maintained HIGH for a finite period of time, typically less than about 100 microseconds. An inverter couples the LOW level so-developed pulse to a CLOCK (CK) input of an edge triggers "D" register 180 (such as a CD4013B). The register 180 is hooked as a divide-by-two element. With 60 Hertz AC power, the periodicity of the CLOCK pulses on line 172 is about 8.33 milliseconds. The signal appearing on lines 184-1,184-2 is a square wave having about 50% duty cycle and a periodicity about 16.67 milliseconds. A pair of inverters 188-1,188-2 together with a resistor 190 and capacitor 192 institutes a multivibrator oscillator preferably producing a relatively high carrier frequency of at least 10-KHz. The high frequency carrier signal on line 194 couples with an input of each NAND gate 186-1,186-2 and therefrom through resistors 196-1,196-2 to the base terminals of the PNP transistors 198-1,198-2. As shown, two transformers 200-1,200-2 provide drive pulses on terminals 202-1,202-2 and 204-1,204-2 which may be utilized as input for the drivers 124-1,124-2 of earlier FIG. 5. A rectifier diode 142-3 couples the earlier rectified transformer power with a storage capacitor, typically of several hundred microfarads to develop a DC power level which couples through a resistor to line 218.

Figure 8:
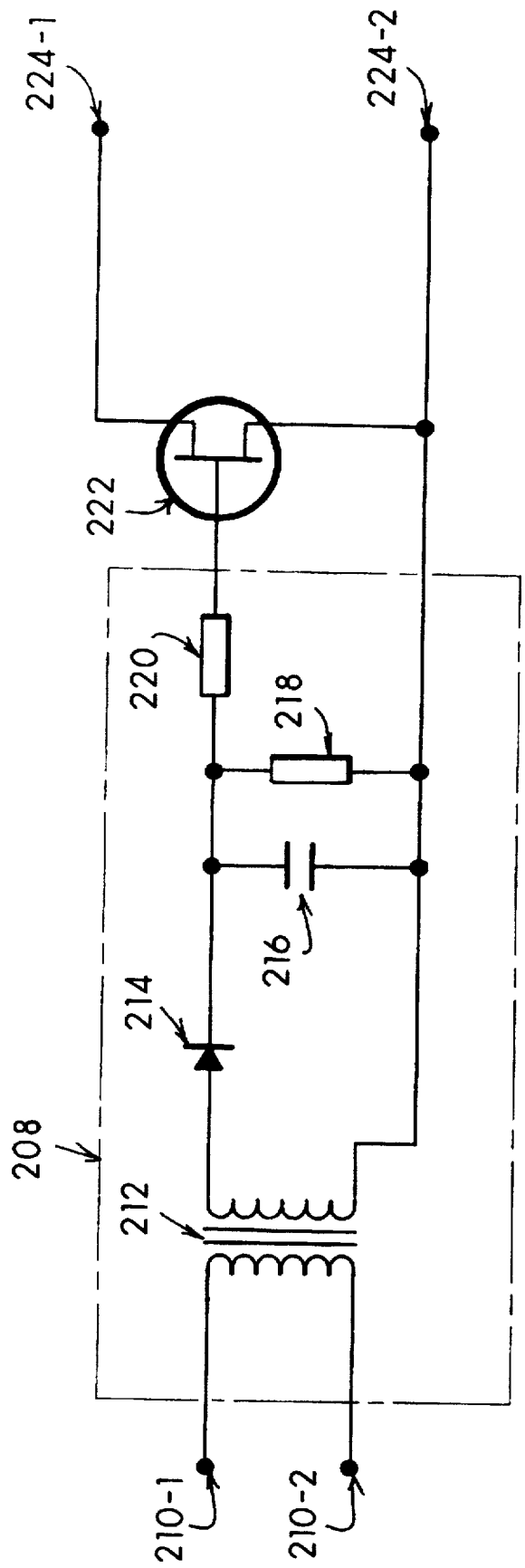
FIG. 8—Driver for MOS-FET switches.

The drivers 64-1,64-2,64-3,64-4 of FIG. 3, and drivers 124-1,124-2 of FIG. 5 may be satisfied by the arrangement 208 of FIG. 8. The controller pulses applied to input terminals 210-1,210-2 (as coupled with correspondent terminals 201-1,202-2, or terminals 204-1,204-2 of FIG. 7) are high in frequency having a carrier frequency preferably greater than 10-KHz. A transformer 212 may additionally isolate the control pulses, with the secondary coupled through a rectifier diode 214 to a capacitor 216 and shunt resistor 218. A DC level of about 10 volts develops across the capacitor 216 that couples through a resistor 220 with the gate of a power MOS-FET 222. The source and drain terminals of the MOS-FET are coupled as earlier said for FIG. 3 and FIG. 5 to provide AC electric power switching in a virtual frequency pattern. In this driver, it is urgent to realize that the time constant of the capacitor 216 and resistor 218 is necessarily short to assure quick turn-off of the MOS-FET when the input signal applied between terminals 210-1,210-2 stops. I have found that a time constant about 80–100 microseconds is suitable, using a 10-Khz carrier signal frequency.

Figure 9:
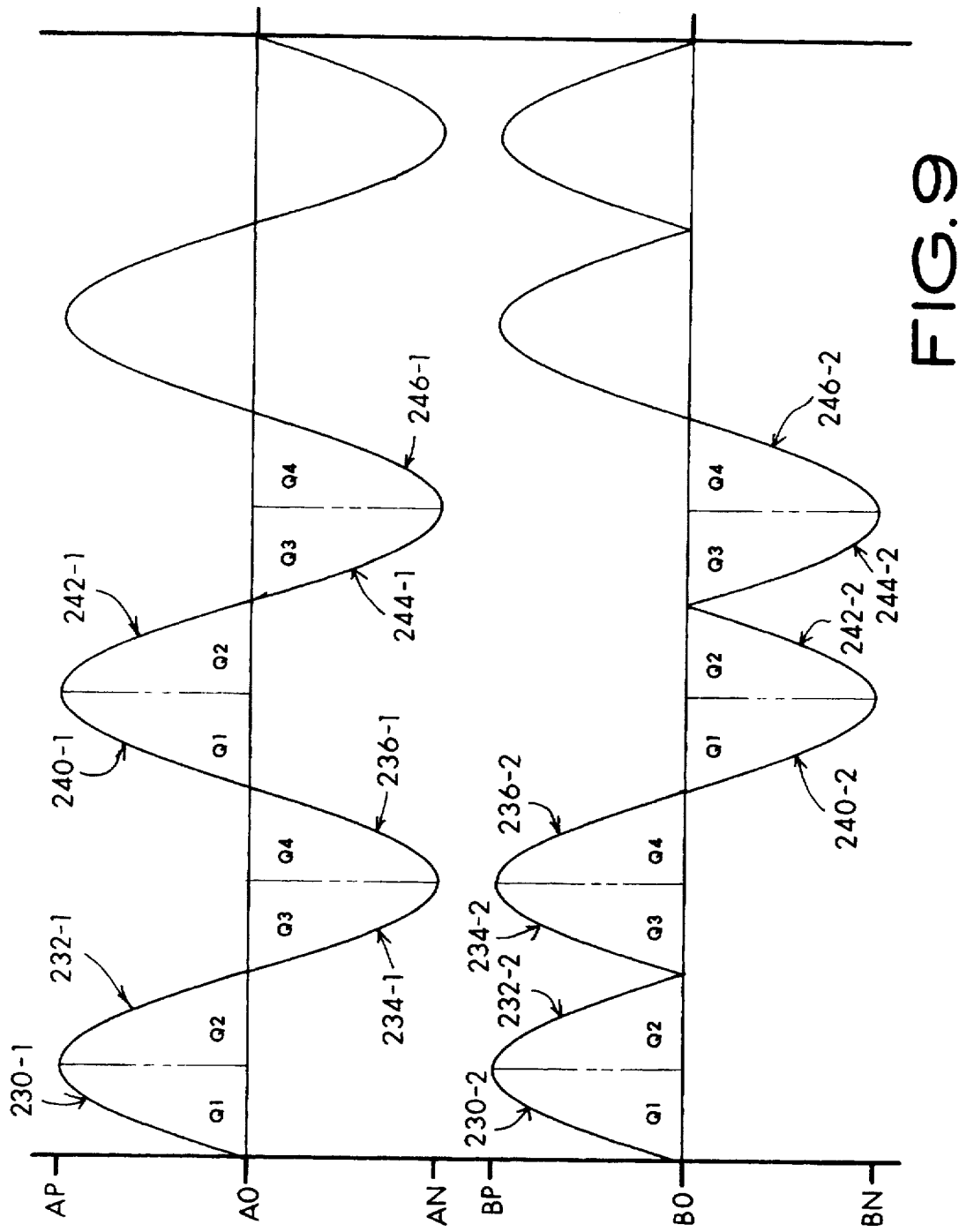
FIG. 9—Virtual subfrequency waveform developed in motor field winding by controller circuitry of FIG. 7.

I depict development of my subfrequency signal in the plots of FIG. 9. The upper waveform comprising a cluster of eight AC power quadrants 230-1,232-1,234-1,236-1,240-1, 242-1,244-1,246-1 is that of the applied AC electric power, such as provided between terminals L1,L2 of earlier FIG. 1. The amplitude develops about the AO axis, swinging equally positive AP and negative AN.

Utilizing the circuitry taught for FIG. 7 in combination with a circuit hookup based upon FIG. 3 a virtual subfrequency signal may be developed across the field winding 54 having an electrical appearance about that of the lower waveform of FIG. 9. As shown here, the quadrantal waveforms 230-2,232-2 are of like polarity to quadrantal waveforms 230-1,232-1.

Observe that quadrantal waveforms 234-2,236-2 have been inverted relative with the quadrantal waveforms 234-1,236-1. Likewise, quadrantal waveforms 240-2,242-2 are inverted relative with the quadrantal waveforms 240-2,242-1. This is necessary to obtain the virtual frequency alternation of bicyclic pairs of pulses, as shown. As an obvious result the virtual frequency assumes a periodicity one-half that of the natural frequency of the prime source of AC electric power. Hence, the 60 Hertz electric power assumes a virtual frequency of 30 Hertz, insofar as the induction motor's field winding 54 excitation is concerned.

Figure 10:
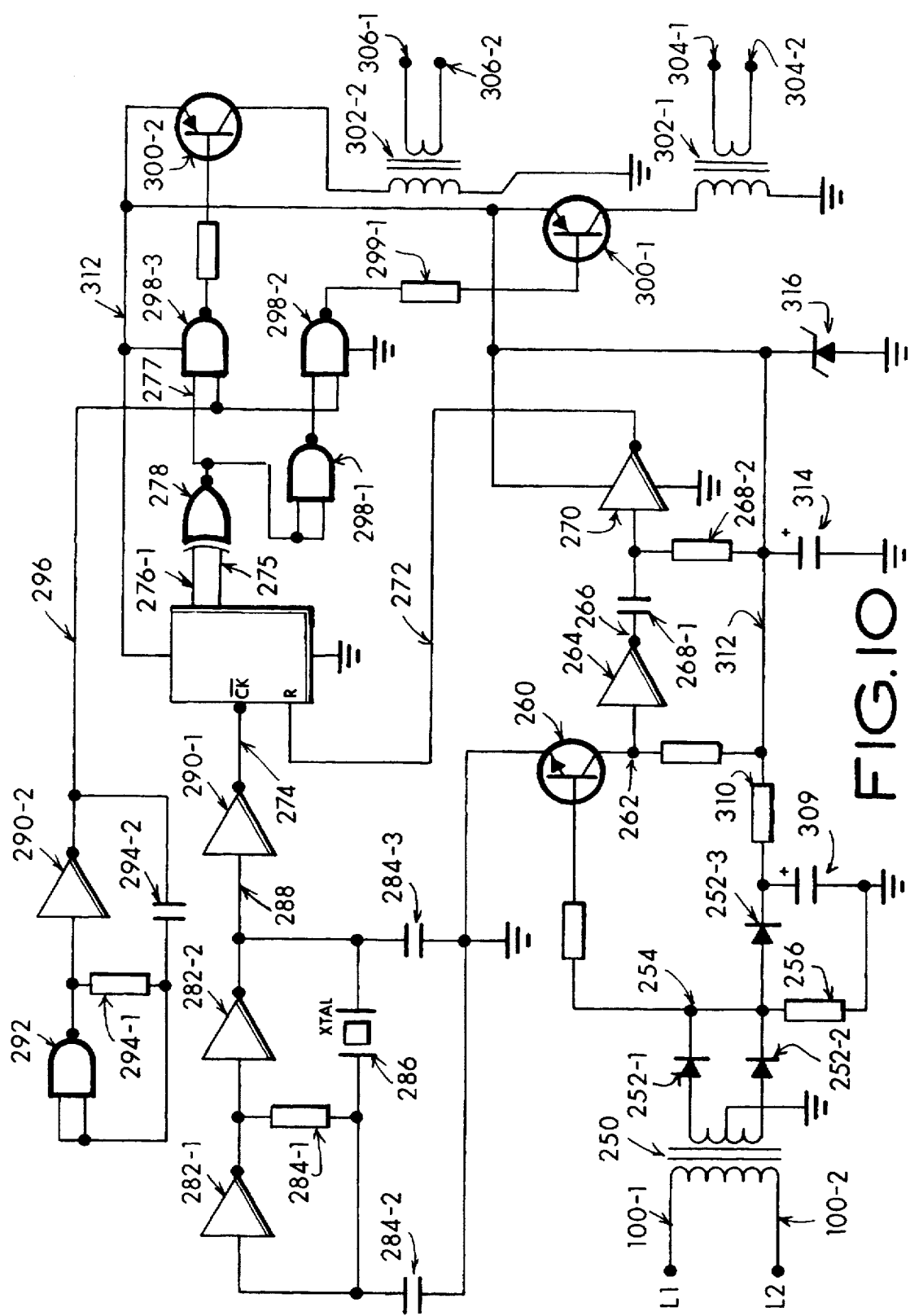
FIG. 10—Suprasynchronous controller circuitry.

A controller suitable for developing a suprafrequency drive signal is shown in FIG. 10. AC electric power couples through terminals L1,L2 with a transformer 250. The transformer secondary includes rectifies 252-1,252-2. A 120 Hertz signal is developed on line 254 which couples via a NPN transistor 260 to develop a narrow positive pulse about coincident with zero crossover of the AC power source frequency. An inverter 264 develops a negative pulse on its output 266 which couples through a capacitor 268-1 which together with resistor 268-2 form a differentiator, therefrom coupled with an input of an inverter 270 to produce a narrow, preferably less than about 10 microsecond duration positive pulse on line 272, coupling with the RESET (R) input of a 14-stage (CD4020B) binary counter 280. Two inverters 282-1, 282-2 together with a resistor 284-1 and capacitors 284-2,284-3 combine with a quartz crystal 286 to embody a crystal oscillator, delivering a fixed high frequency on line 288 which couples through an inverter 290 to a CLOCK (/ICK) input of the counter 280. The QNA output 275 (e.g., usually Q14 output) and the QNB output 276-1 (e.g., the Q13 output) couple with an XNOR (exclusive-NOR) gate 278. The counter 280 QNA output 275 delivers a LOW to HIGH transistion 8,192 clock counts subsequent to RESET of the counter. RESET occurs every 8.33 milliseconds, introduced by the pulse signal on line 272. Similarly, the counter's QNB output 276-1 delivers a LOW to HIGH transistion, and the QNA output 275 returns LOW, 16,384 clock counts subsequent to RESET of the counter. For the period prior to count 8,192 both the QNA and QNB outputs are LOW and the XOR gate output is LOW. During the interval between 8,192 and 24,576 counts either QNA or QNB are separately HIGH resulting in a HIGH output from the XOR gate 278. After count 24,576, both the QNA and QNB outputs return LOW and the XOR gate 278 output returns LOW.

During the period when the XOR gate 278 output is LOW on line 277, the inverter 298-1 produces a HIGH state at the input of NAND gate 298-2 therefrom coupled with a base terminal of a PNP transistor 300-1. The result is a coupling of the high frequency signal through the transformer 302-1 to terminals 304-1,304-2.

During the period when the XOR gate 278 output is HIGH (e.g., between counts 8,192 and 24,576 of the counter 280) the state on line 277 couples with an input of NAND gate 298-3 enabling the gate. As a result, the oscillator signals on line 296 couple through the PNP transistor 300-2 to the transformer 302-2. The high frequency driver control signal appears on terminals 306-1,306-2 during this time.

If the CLOCK signal on line 274 is preferably about 983,040 Hertz, the counter will count up to 4,096 in approximately 4.167 milliseconds. This is about the duration of the first quadrant of 60 Hertz power. In other words, the pulse on the QNA output signal line 275 switches HIGH about 4.167 milliseconds after zero crossover, corresponding with the peak of the first quadrant.

Subsequent to another 4,096 counts (e.g., at count 8,192) the QNB output signal line 276-1 goes HIGH and signal line 275 goes LOW. The HIGH state on signal line 276-1 remains until count 16,384 whereupon a LOW state reappears on line 276-1 and line 275 goes HIGH until count 24,576 is reached at the onset of the 60 Hertz AC power cycle quadrant 4, whereupon the QNA output returns LOW and the QNB output remains LOW.

A gate 290 and inverter 292 together with resistor 294-1 and capacitor 294-2 devise a high frequency oscillator delivering preferably an at least 10 KHz signal on line 296 which couples with another input of each NAND gate 298-2,298-3 thereby modulating the signals coupled through the gates and with the transistors 300-1,300-2 with the 10 KHz pulses developed by the oscillator.

Figure 11:
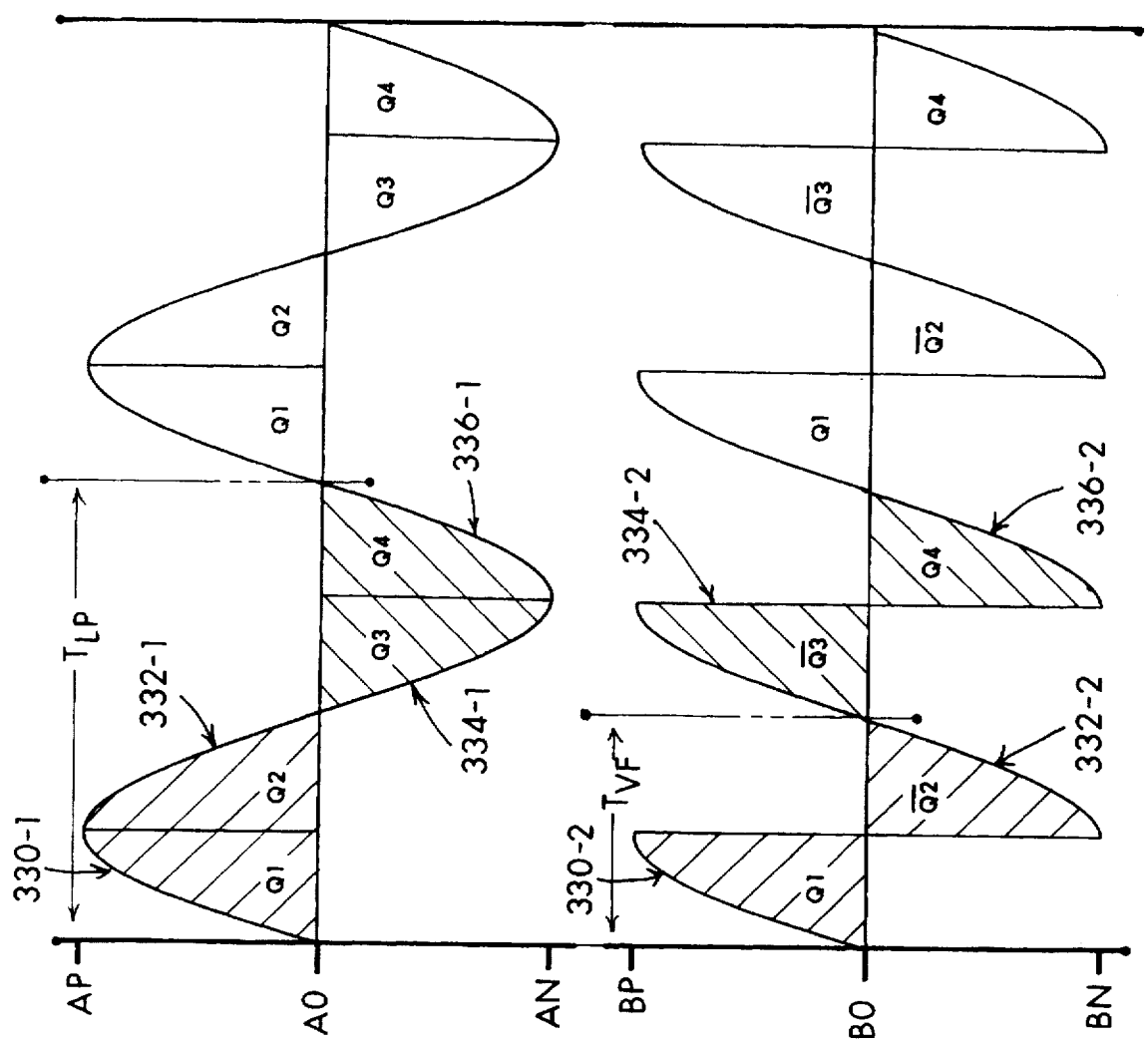
FIG. 11—Virtual suprafrequency waveform developed in motor field winding by controller circuitry of FIG. 10.

I depict development of my suprafrequency signal in the plots of FIG. 11. The upper waveform comprising a cluster of four AC power quadrants 330-1,332-1,334-1,336-1 is that of the applied AC electric power, such as provided between terminals L1,L2 of earlier FIG. 1. The amplitude develops about the AO axis, swinging equally positive AP and negative AN.

Utilizing the circuitry taught for FIG. 10 in combination with a circuit hookup based upon FIG. 3 a virtual suprafrequency signal may be developed across the field winding 54 having an electrical appearance about that of the lower waveform of FIG. 11. As shown here, the quadrantal waveforms 330-2,236-2 are of like polarity to quadrantal waveforms 330-1,236-1.

Observe that quadrantal waveforms 334-2,336-2 have been inverted relative with the quadrantal waveforms 334-1,336-1. As an obvious result the virtual frequency assumes a periodicity double that of the natural frequency of the prime source of AC electric power. Hence, the 60 Hertz electric power assumes a virtual frequency of 120 Hertz, insofar as the induction motor's field winding 54 excitation is concerned. The result is about double speed operation of the motor.

Figure 12:
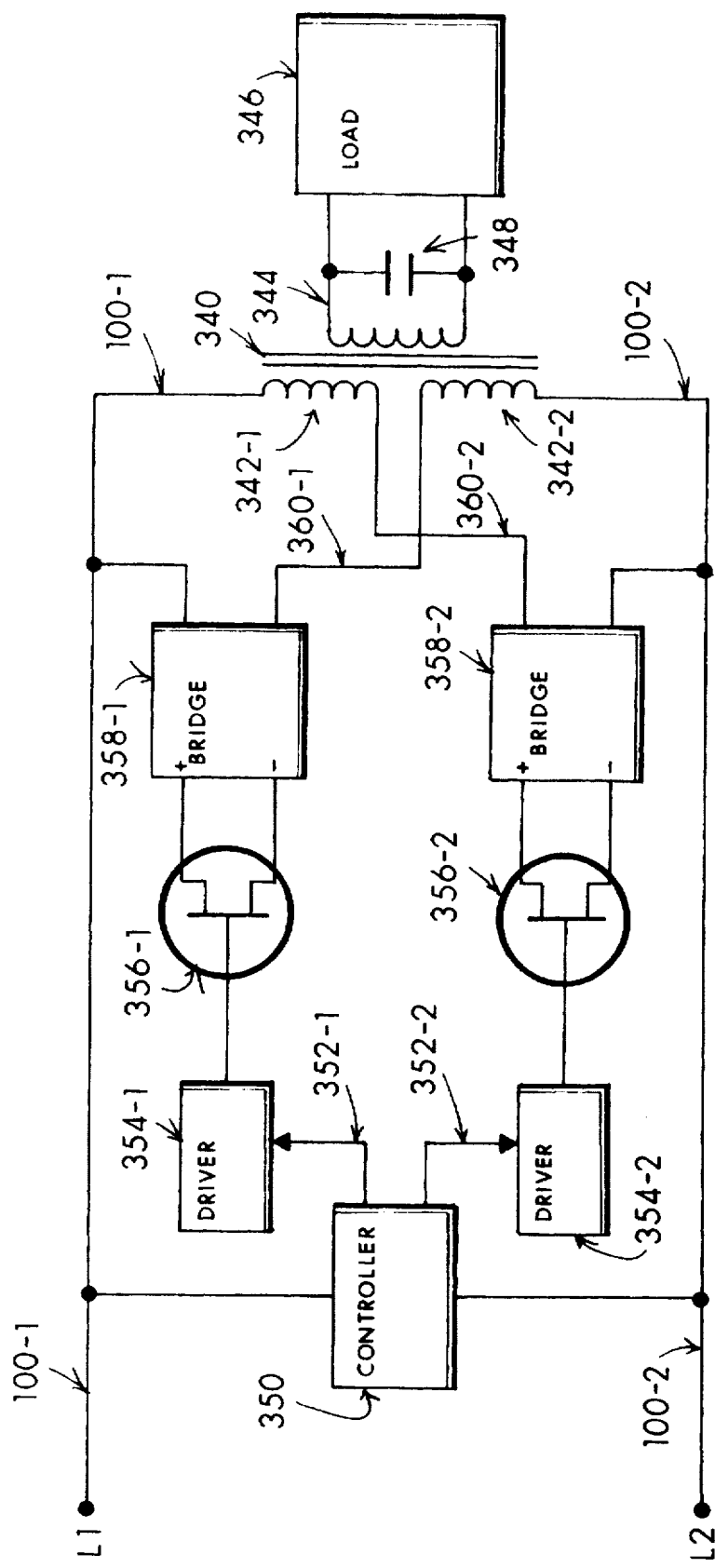
FIG. 12—Pseudofrequency driver for transformer coupled load.

A transformer 340 coupled load, operated by the parafrequency switching arrangement of my invention, appears in FIG. 12. AC electric power is provided on lines 100-1,100-2. A controller 350 typically provides two control signals 352-1,352-2 which provide the switching signals for drivers 354-1,354-2. It is the object of the driver to convert the control signals into the pseudofrequency ON/OFF gating signals for the MOS-FET devices 356-1,356-2, each having a drain and source connection coupled with the usual "output" or (+ and −) DC side of a bridge rectifier device 358-1,358-2. The bridge rectifier devices' usual AC input terminals are subsequently coupled serially between the AC power lines 100-1,100-2 and the transformer 340 primary windings 342-1,342-2 as shown.

TABLE 16

SUBFREQUENCY OPERATION (Virtual 30 Hz)

| MOS-FET DEVICE | A.C POWER CYCLE QUADRANTS | | | | | | | |
|---|---|---|---|---|---|---|---|---|
| | Q1 | Q2 | Q3 | Q4 | Q5 | Q6 | Q7 | Q8 |
| 356-1 | 1 | 1 | 0 | 0 | 0 | 0 | 1 | 1 |
| 356-2 | 0 | 0 | 1 | 1 | 1 | 1 | 0 | 0 |

TABLE 17

SUBFREQUENCY OPERATION (Virtual 120 Hz)

| MOS-FET DEVICE | A.C POWER CYCLE QUADRANTS | | | | | | | |
|---|---|---|---|---|---|---|---|---|
| | Q1 | Q2 | Q3 | Q4 | Q5 | Q6 | Q7 | Q8 |
| 356-1 | 1 | 0 | 0 | 1 | 1 | 0 | 0 | 1 |
| 356-2 | 0 | 1 | 1 | 0 | 0 | 1 | 1 | 0 |

Key:
0 = OFF
1 = ON

In this arrangement, a single MOS-FET devices is usually turned-ON at any given instant, following Table 16 for a virtual subfrequency on the transformer secondary 344, or following Table 17 for delivering a virtual suprafrequency to the load 346. A capacitor 348 appears across the transformer secondary winding 344 and in parallel with the load 346. I find that a capacitor offers a smoothing effect and thereby enhances the waveform of the power signal applied to the load.

Figure 13:
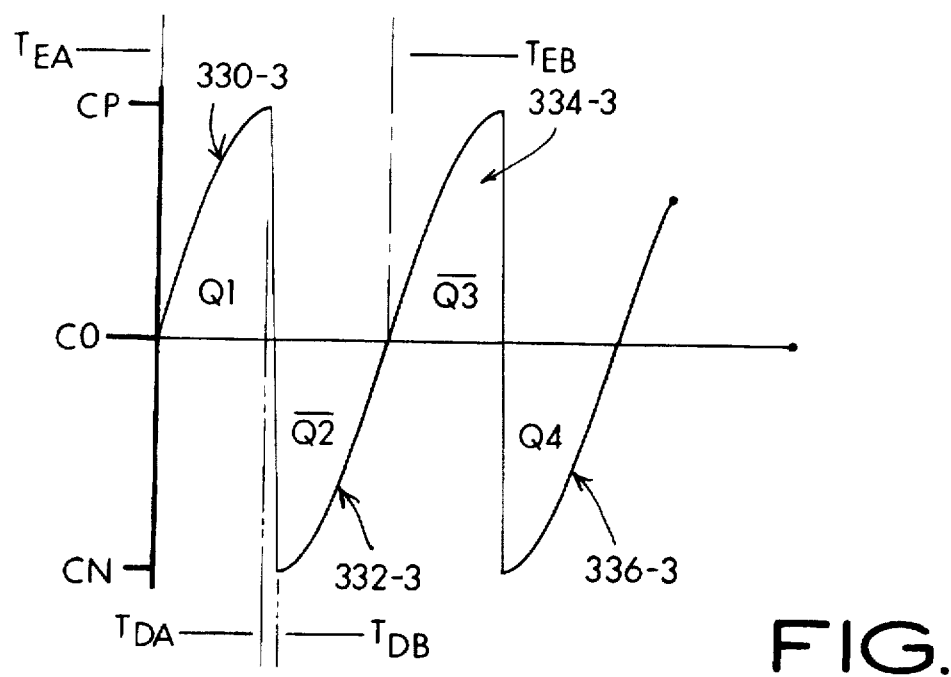
FIG. 13—Virtual suprafrequency waveform of FIG. 11 showing a polarity inversion switchover delay between Q1 and /Q2, and between /Q3 and Q4.

A waveform depiction showing intraquadrantal control of a suprafrequency signal similar to that of FIG. 11 appears in FIG. 13 to illustrate a small delay between turn-off of the first quadrant Q1 and turn-on of the inverted second quadrant Q2. This delay permits the energy which may be stored in the Q1 load to start collapse before the Q2 power of opposite polarity sense is applied, reducing the abruptness of the transistion.

Figure 14:
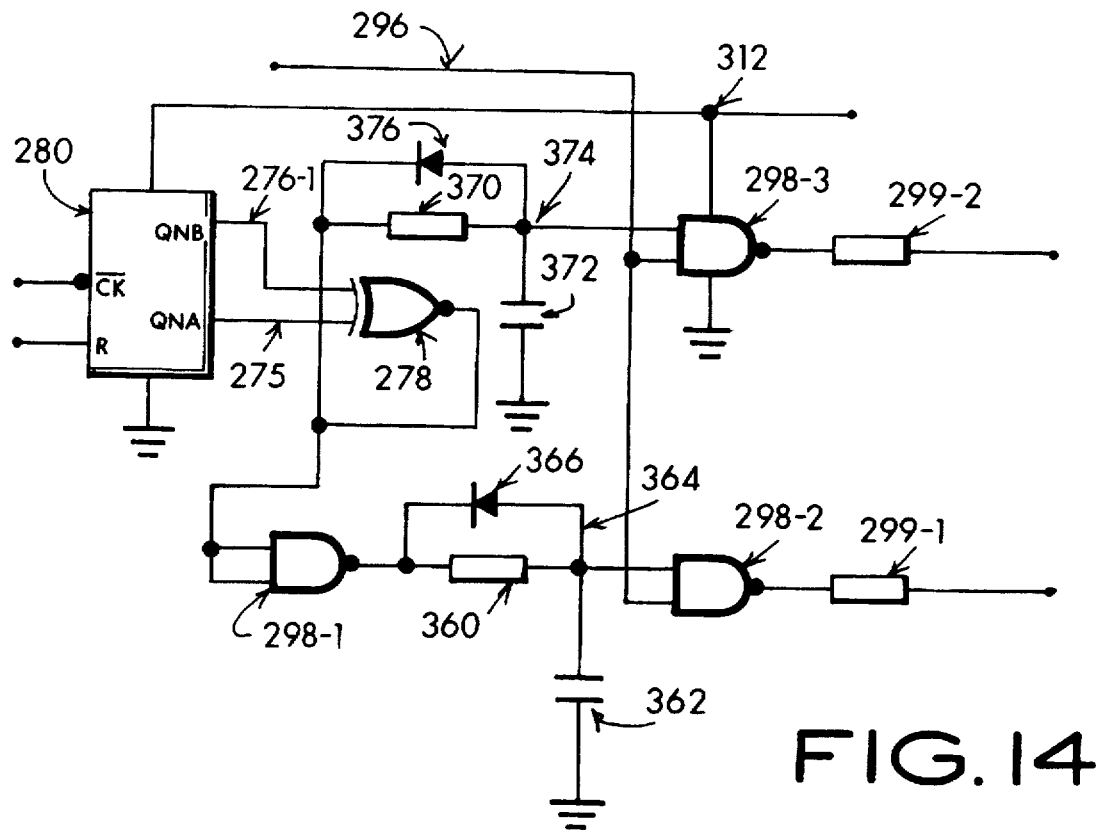
FIG. 14—Circuit extension to controller circuitry of FIG. 10 providing polarity inversion switch over delay.

In FIG. 14 I show that the desired delay as mentioned relative with FIG. 13 may be developed utilizing an extension of the circuitry given in FIG. 10. Noting the differences from the FIG. 10 circuit, you will find that the output of the gate 298-1 couples through an integrator comprising a resistor 360, capacitor 362 and recovery diode 366 to develop an about 80-microsecond retarded signal on line 364 at the input of gate 298-2.

Similarly, the output of the XOR gate 278 couples through an integrator comprising a resistor 370, capacitor 372 and recovery diode 376 to develop an about 80-microsecond retarded signal on line 374 at the input of gate 298-3.

Figure 15:
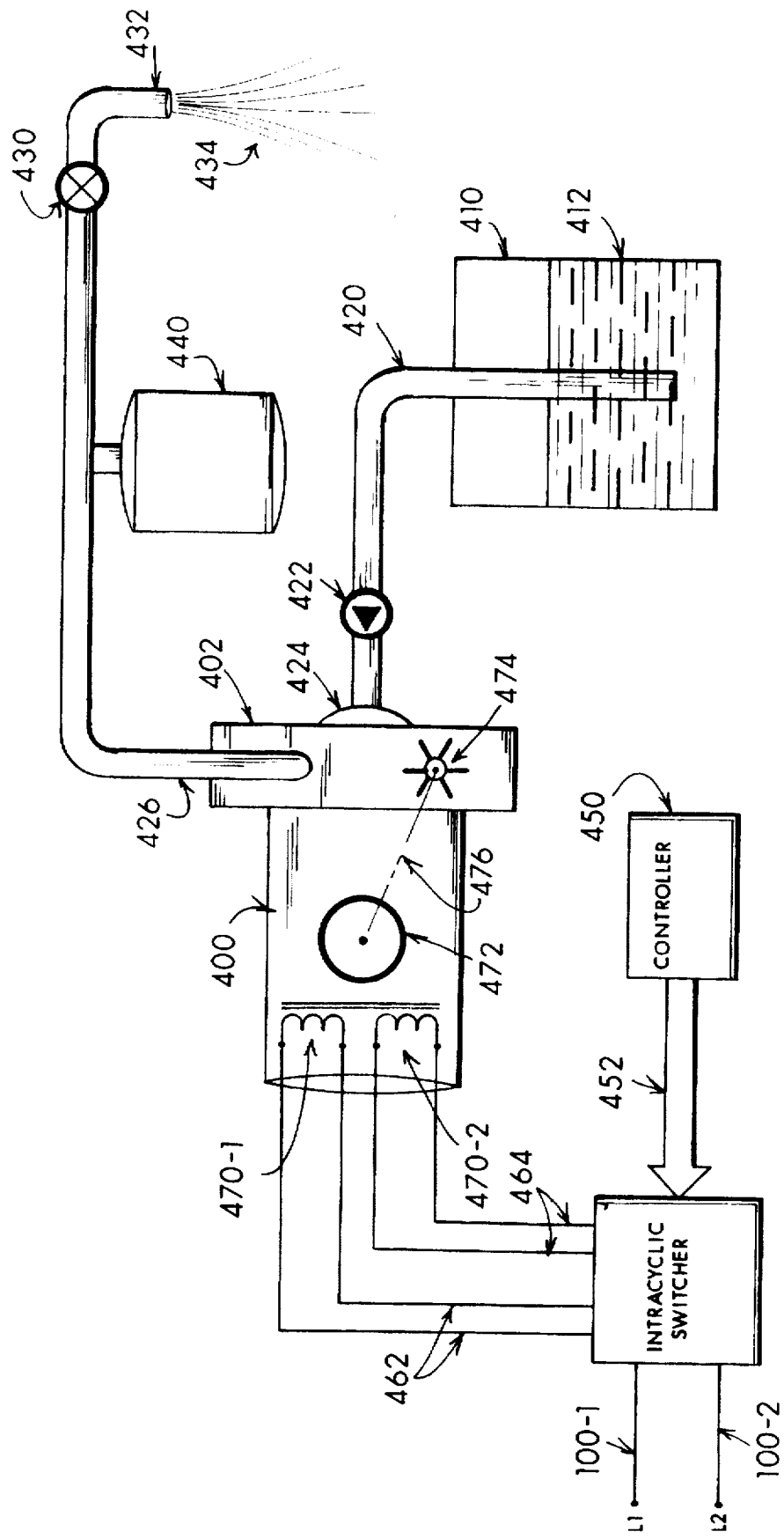
FIG. 15—Centrifugal "Jet" fluid pump motor advantageously operated by suprasynchronous excitation.

One of the attractive applications for my suprasynchronous adaptation of my invention is shown in FIG. 15 for the operation of centrifugal pumps and in particular the class of pumps commonly called "Jet" pumps frequently used for potable water pumping from wells, cisterns, lakes and the like. Common pumps of this type usually limit their output water pressures to about 40 P.S.I., with a corresponding limit on "lift". It is well known and long established that the efficacity of such centrifugal "Jet" pumps may be markedly improved with higher impeller speeds. Usually these types of pumps are direct coupled to a 3,450 RPM induction motor. As a result, little improvement has been seen for a long time in this class of pump, aside from refinements of impeller and pump cavity designs. With my invention, it is conceivable to increase the impeller speed from the current art's 3,450 RPM rate to about 6,900 RPM. Such an improvement in impeller performance results in substantially more lift, thereby realizing substantially higher "water pressure" performance. It is possible to achieve water pressures comparable to those attained with public water supplies (e.g., 60–100 PSI) with little change in the design of existing pump hardware. In FIG. 15 the motor 400 couples with the pump (including an impeller, not shown) in a housing 402. I shown a source of water 410, including the water 412 having a suction tube 420 immersed in the water source. A check valve 422 denies backflow and the suction tube assembly attaches to the inlet port 424 of the pump.

The pump includes an outlet port 426 extended to a valve 430 and subsequently to an outlet 432 (such as a spigot) from which a flow 434 of pumped water may be obtained. I also show the presence of a storage tank 440.

The motor 400 obtains electrical operation from the AC power lines 100-1,100-2 through an intracyclic switcher 460 not unlike that which was earlier sketched in FIG. 5, for example. A controller 450 develops the necessitous driver signals coupled via line 452 with the intracyclic switcher. The switcher output lines 462,464 couple with the motor's field windings 470-1,470-2 to produce a power flow pattern including a dynamic quadrantal inversion of instant AC phase and thereby enable development of the virtual suprafrequency rate of NORTH and SOUTH magnetic field pole reversals which act upon the rotor 472 to obtain increased parasynchronous operation of the rotor and subsequently, the pump impeller 474 affixed to or otherwise coupled with 476 the rotor's output member.

In my earlier FIG. 5 I showed a hookup for a dual field winding motor utilizing MOS-FET switches 126-1,126-2 in combination with full wave diode bridges 128-1,128-2. Now in FIG. 16 I choose to depict a variant upon this earlier hookup wherein I can obtain some economy through the elimination of the two bridges 128-1,128-2 and replacing the two bridges with two power diodes 480,490.

The diode 480 couples the positive half cycles of AC power from line 100-3 (which couples with line 100-1 via a jumper 498) to line 482 and one end of the motor field winding 102. As before, the other end of the field winding 102 is coupled with a drain terminal of a MOS-FET switch device 126-3.

The diode 490 couples the negative half cycles of AC power from line 100-3 to line 492 and one end of the motor field winding 104. As before, the other end of the field winding 104 is coupled with a a drain terminal of a MOS-FET switch device 126-4.

A the controller 120 provides a pattern of gating pulses for the MOS-FET devices. A subfrequency field pole switching rate of 30-Hertz, resulting in a 4-pole motor shaft speed of about 860 RPM and a suprafrequency field pole switching rate of 120-Hertz, resulting in a 2-pole induction motor shaft speed of about 6,900 RPM may be readily oubtained utilizing a MOS-FET switching pattern which may be represented by the following tables:

TABLE 18

| SUBSYNCHRONOUS OPERATION (½ line freq.) | | | | | | | | |
|---|---|---|---|---|---|---|---|---|
| MOS-FET | A.C. CYCLE ELECTRIC POWER QUADRANTS | | | | | | | |
| DEVICE | Q1 | Q2 | Q3 | Q4 | Q5 | Q6 | Q7 | Q8 |
| 126-3 | 1 | 1 | 1 | 1 | 0 | 0 | 0 | 0 |
| 126-4 | 0 | 0 | 0 | 0 | 1 | 1 | 1 | 1 |

Where for MOS-FET state: 0 = OFF 1 = ON

TABLE 19

| SUBSYNCHRONOUS OPERATION (½ line freq.) | | | | | | | | |
|---|---|---|---|---|---|---|---|---|
| MOS-FET | A.C. CYCLE ELECTRIC POWER QUADRANTS | | | | | | | |
| DEVICE | Q1 | Q2 | Q3 | Q4 | Q5 | Q6 | Q7 | Q8 |
| 126-3 | 1 | 0 | 1 | 0 | 1 | 0 | 1 | 0 |
| 126-4 | 0 | 1 | 0 | 1 | 0 | 1 | 0 | 1 |

Realize that, with this dual winding arrangement, each winding 102,104 is only carrying unidirectional power half of the time. As a result, the gauge of the wire required to construct each of the windings may be about one half the CM (circular mils.) of that whis is ordinarily specified. In other words, the amount of copper in each winding is about one half that which is usually required when only one winding is used.

Two capacitors 484,494 may be used. It is preferable that the capacitors be relatively small in size. I find the principal purpose for the capacitors is to advance the lagging phase angle produced by switching the inductive field coil windings. Therefore, the capacitance of the capacitors is selected to enhance the motor's operational power factor. I further show an inductor 496 of small size which may be utilized in place of the jumper 498. The intent of the small inductor is to slightly retard the leading phase angle introduced by the capacitors. As a result, I can obtain an improved extent of operational power factor through judicious selection of the capacitors 484,494 and the inductor 496 relative with the inductive characteristics of the motor's field windings 102, 104 particularly when the motor is operating a load which is relatively constant, such as pumps, fans and the like.

Figure 16:
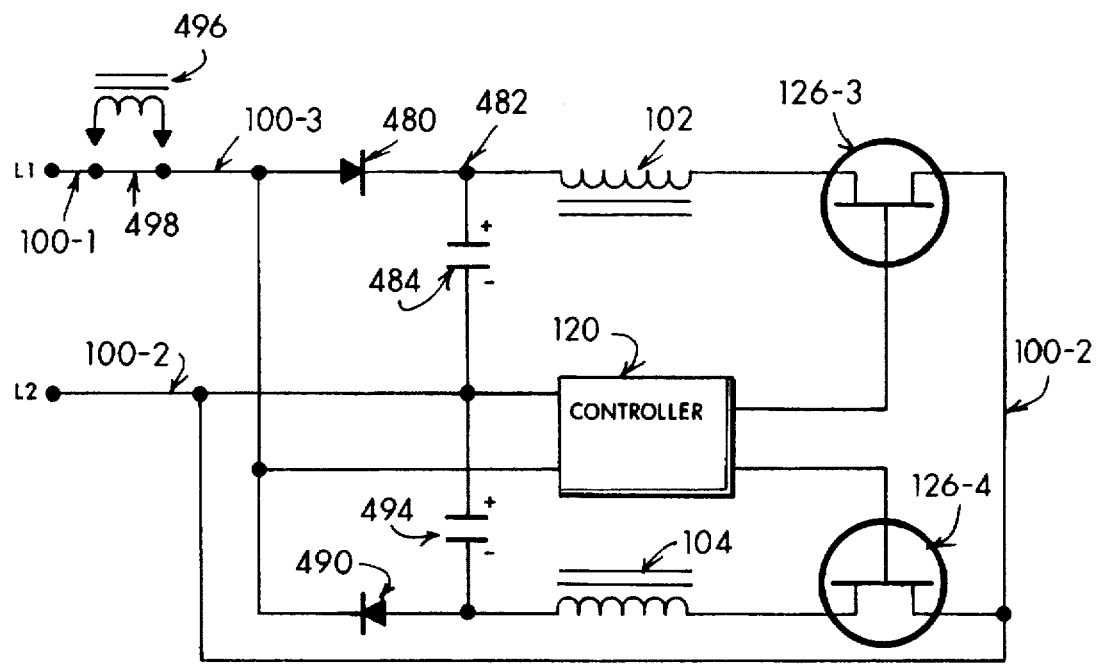
FIG. 16—Power switching arrangement utilizing a dual field winding and a power diode half-bridge.
Figure 17:
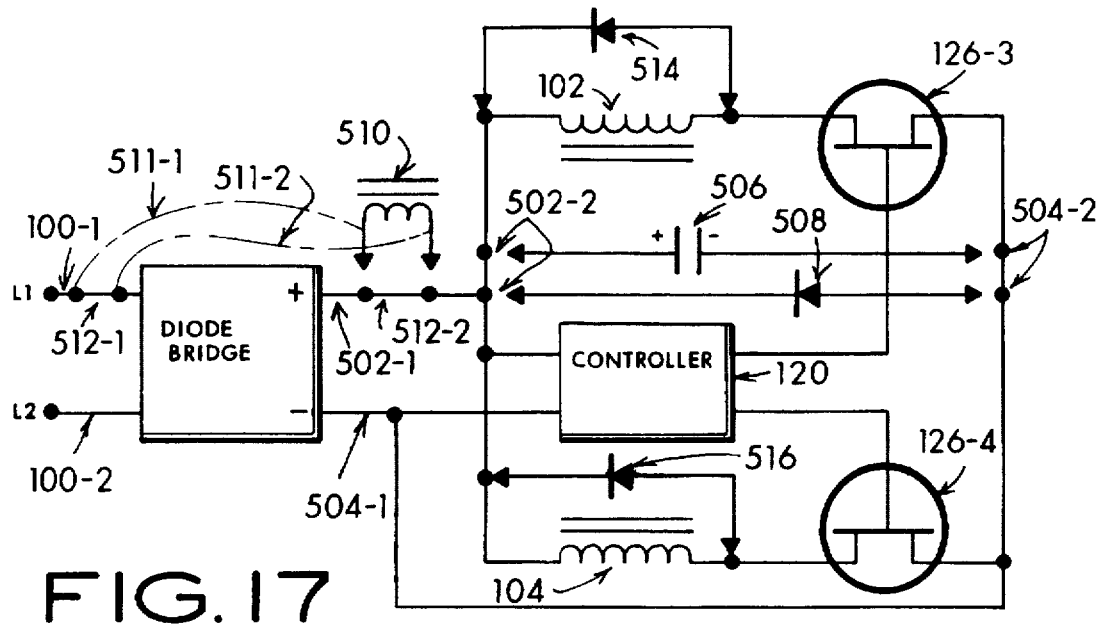
FIG. 17—Power switching arrangement utilizing a dual field winding and a power diode full-bridge.

In FIG. 17 I show a circuit variation upon that shown for FIG. 16 wherein a diode bridge 500 couples between the AC electric power lines 100-1,100-2 and the motor circuitry coupled between positive line 502-1 and negative line 504-1. The controller 120 produces a switching action following the SUBFREQUENCY or SUPRAFREQUENCY quadrant switching patterns shown in TABLE 18 and TABLE 19. Electrical phasing of the windings 102, 104 is arranged whereby winding 102 produces a relative NORTH and SOUTH polar sense, while winding 104 produces a relative SOUTH and NORTH polar sense in the same field pole structure. I show a capacitor 506, of relatively small capacitance value, which may be used to correct power factor levels particularly when combined with a small inductor 510 coupled as depicted by the broken lines 511-1,511-2 in series with the input side of the bridge in place of jumper 512-1, or less preferably on the output side of the bridge in place of jumper 512-2. I also show a diode 508 which may be used to protect against electric potential polarity reversal between lines 502-2 and 504-2.

Any attempt by another to circumvent the essence of my invention shall be prudently viewed with caution and suspicion. I realize that other physical embodiments exhibiting a difference in implementation detail from that which I depict might be practiced by others. For example, other arrangements of MOS-FET or thyristor switches may be utilized, with or without companion half-bridge or full-bridge rectifiers. Furthermore, the development of a suitable switching sequence utilizing a controller which differs in embodiment detail shall not subvert my underlying teaching which is that of steering quadrants of AC electric power through the field windings of an electric induction motor so as to produce a virtual pseudosynchronous rate of magnetic field change to induce parasynchronous rotation of an output member usually coupled with the rotor of the motor. However, any such mere departure from the shown physical embodiment's explicit details is a well known and frequently exercised common practice of engineering skills by persons knowledgeable in the underlying art. Therefore all such practical variations, irrespective of their extent, shall be found as obvious hindsight variations and to be irrefutably within the scope of my invention as taught and herewithin claimed.

DEFINITION OF CERTAIN TERMS

| | |
|---|---|
| AC | Alternating Current, electric power |
| DC | Direct Current electric power as usually rectified from the AC electric power |
| CAC | Converted AC power, a chopped-DC pseudo-alternating power level |
| MOS-FET | Metal Oxide Semiconductor class of Field Effect Transistor |
| CPS | Cycles per Second, equivalent to Hertz |
| RPM | Revolutions per Minute, rotational speed |
| Hertz or Hz | equivalent to cycles per second |

Prime Frequency—Frequency of Source of AC electric power, usually 60 Hertz in North America or 50 Hertz elsewhere.

Slip Frequency—Frequency of AC coupling between the stator and a rotor of an induction motor, determined by a difference in RPM of rotating magnetic field rate as synchronously established by the applied AC electric power frequency, and the mechanical rotation speed of the rotor.

Parasynchronous—cycle rate harmonically synchronous with the AC electric power rate but at one-half the periodicity or twice the periodicity.

Pseudosynchronous—a motor RPM speed about synchronous with the usual RPM operating speed of a motor having a designated number of poles and operating from an AC power source but the actual pseudosynchronous RPM speed, albeit virtually synchronous, is nearly one-half or double the usual RPM operating speed dictated by conventional wisdom.

Synchronous—a frequency or motive rate factor which is directly derived from the alternation periodicity of a source of AC electric power.

Synchronous Speed—a motor's usual prior art operating speed in RPM with a designated number of poles and operating from an AC power source of finite frequency, such as 50 or 60 Hertz.

Subsynchronous—a virtual synchronous factor involving frequency or motive rate which is a submultiple of (and usually ½ or ⅓) that which prior art defines as synchronous.

Suprasynchronous—a virtual synchronous factor involving frequency or motive rate which is a multiple of (and usually double) that which prior art defines as synchronous.

Quadrant—Ninety electrical degrees wherein a full AC cycle is 360 degrees.

Bicycle—A singular portion of an AC power signal waveform comprising a cluster of two consecutive cycles. (4-half cycles, 8-quadrants, and 720 degrees in duration).

Exceptional Rate—An exceptional rate of motor output member rotational speed may be either exceptionally slow in the subsynchronous mode and exceptionally fast in the suprasynchronous mode wherein the "exception" is relative to the rate of rotational speed provided by the prior art.

DRAWING REFERENCE CHARACTERS WORKSHEET

The following Numerals and/or Letters have been used for reference characters:

| No. | Element Name |
|---|---|
| 1 | Source of AC Power |
| 10 | Rotor |
| 12 | Field Winding |
| 14-1 | Field Winding Start |
| 14-2 | Field Winding Finish |
| 16 | Rotor coupling with Load |
| 18 | Mechanical Load |
| 20-1 | AC Line L1 |
| 20-2 | AC Line L2 |
| 22 | Intracyclic Controller |
| 24 | Coupling |
| 26 | Switching Device SPDT |
| 28 | Switching Device SPDT |
| 30 | Induction Motor |
| 32 | Field Winding (Single) |
| 34 | Rotor |
| 36 | Key |
| 40-1 | First End of Field Winding |
| 40-2 | Second End of Field Winding |
| 42-1 | First Path Start |
| 42-2 | First Path Finish |
| 44-1 | Second Path Start |
| 44-2 | Second Path Finish |
| 46-1 | Third Path Start |

| No. | Element Name |
|---|---|
| 46-2 | Third Path Finish |
| 48-1 | Fourth Path Start |
| 48-2 | Fourth Path Finish |
| 50-1 | AC Line L1 |
| 50-2 | AC Line L2 |
| 52 | Induction Motor |
| 54 | Field Winding (Single) |
| 56-1 | Field Winding Start |
| 56-2 | Field Winding Finish |
| 60 | Controller |
| 62-1 | Control Signal A |
| 62-2 | Control Signal B |
| 62-3 | Control Signal C |
| 62-4 | Control Signal D |
| 64-1 | Driver A |
| 64-2 | Driver B |
| 64-3 | Driver C |
| 64-4 | Driver D |
| 66-1 | Switch A |
| 66-2 | Switch B |
| 66-3 | Switch C |
| 66-4 | Switch D |
| 68-1 | Bridge A |
| 68-2 | Bridge B |
| 68-3 | Bridge C |
| 68-4 | Bridge D |
| 70 | Induction Motor |
| 72-1 | Field Winding, First |
| 72-2 | Field Winding, Second |
| 74 | Rotor |
| 76 | Key |
| 80-1 | Start, First Field Winding |
| 80-2 | Finish, First Field Winding |
| 82-1 | Start, Second Field Winding |
| 82-2 | Finish, Second Field Winding |
| 84-1 | First Path, Start |
| 84-2 | First Path, Finish |
| 86-1 | Second Path, Start |
| 86-2 | Second Path, Finish |
| 88-1 | Third Path, Start |
| 88-2 | Third Path, Finish |
| 90-1 | Fourth Path, Start |
| 90-2 | Fourth Path, Finish |
| 100-1 | AC Line L1 |
| 100-2 | AC Line L2 |
| 102 | Induction Motor Field |
| 104 | Field Winding, First |
| 106 | Field Winding, Second |
| 108 | Rotor |
| 110 | Start, First Field Winding |
| 112 | Finish, Second Field Winding |
| 120 | Controller |
| 122-1 | Drive Signal A |
| 122-2 | Drive Signal B |
| 124-1 | Driver A |
| 124-2 | Driver B |
| 126-1 | Switch A |
| 126-2 | Switch B |
| 126-3 | Switch A |
| 126-4 | Switch B |
| 128-1 | Diode Bridge A |
| 128-2 | Diode Bridge B |
| 130 | Controller |
| 132-1 | Drive Signal A |
| 132-2 | Drive Signal B |
| 132-3 | Drive Signal C |
| 132-4 | Drive Signal D |
| 134-1 | Driver A |
| 134-2 | Driver B |
| 134-3 | Driver C |
| 134-4 | Driver D |
| 136-1 | Thyristor A |
| 136-2 | Thyristor B |
| 136-3 | Thyristor C |
| 136-4 | Thyristor D |
| 138-1 | Gate of Thyristor A |
| 138-2 | Gate of Thyristor B |
| 138-3 | Gate of Thyristor C |
| 138-4 | Gate of Thyristor D |
| 140 | Transformer |
| 142-1 | Rectifier Diode |
| 142-2 | Rectifier Diode |
| 144 | Pulsating DC Line |
| 146 | Resistor |
| 150 | NPN Transistor |
| 152 | Collector Signal Line |
| 154 | Inverter |
| 156 | Inverted Signal Line |
| 158-1 | Capacitor |
| 158-2 | Resistor |
| 160-1 | NAND Gate |
| 160-2 | NAND Gage |
| 162 | Signal Line |
| 164 | Capacitor |
| 166 | Juncture Line |
| 168-1 | Resistor |
| 168-2 | Resistor, Adjustable |
| 170 | Inverter |
| 172 | Clock Signal Line |
| 180 | D register (D flip/flop) |
| 182 | Feedback Line |
| 184-1 | Q Output Line |
| 184-2 | /Q Output Line |
| 186-1 | NAND Gate |
| 186-2 | NAND Gate |
| 188-1 | Inverter |
| 188-2 | Inverter |
| 190 | Resistor |
| 192 | Capacitor |
| 194 | Signal Line |
| 196-1 | Resistor |
| 196-2 | Resistor |
| 198-1 | PNP Transistor |
| 198-2 | PNP Transistor |
| 200-1 | Pulse Transformer |
| 200-2 | Pulse Transformer |
| 202-1 | Drive Signal Output A1 |
| 202-2 | Drive Signal Output A2 |
| 204-1 | Drive Signal Output B1 |
| 204-2 | Drive Signal Output B2 |
| 208 | Driver |
| 210-1 | Driver Signal Input 1 |
| 210-2 | Driver Signal Input 2 |
| 212 | Pulse Transformer |
| 214 | Diode |
| 216 | Capacitor |
| 218 | Resistor |
| 220 | Resistor |
| 222 | MOS-FET Power Switch |
| 224-1 | Drain Connection |
| 224-2 | Source Connection |
| 230-1 | Prime Power Quadrant 1 |
| 230-2 | Subfrequency Quadrant 1 |
| 232-1 | Prime Power Quadrant 2 |
| 232-2 | Subfrequency Quadrant 2 |
| 234-1 | Prime Power Quadrant 3 |
| 234-2 | Inverted Subfreq. Quadrant 3 |
| 236-1 | Prime Power Quadrant 4 |
| 236-2 | Inverted Subfreq. Quadrant 4 |
| 240-1 | Prime Power Quadrant 1 |
| 240-2 | Inverted Subfreq. Quadrant 1 |
| 242-1 | Prime Power Quadrant 2 |
| 242-2 | Inverted Subfreq. Quadrant 2 |
| 244-1 | Prime Power Quadrant 3 |
| 244-2 | Subfrequency Quadrant 3 |
| 246-1 | Prime Power Quadrant 4 |
| 246-2 | Subfrequency Quadrant 4 |
| 250 | Transformer Power |
| 252-1 | Rectifier Diode |
| 252-2 | Rectifier Diode |
| 254 | Pulsating DC Signal Line |
| 256 | Resistor |
| 260 | NPN Transistor |
| 262 | Collector Signal Line |
| 264 | Inverter |
| 266 | Inverted Signal Line |

| No. | Element Name |
|---|---|
| 268-1 | Capacitor |
| 268-2 | Resistor |
| 270 | Inverter |
| 272 | Reset Signal Line |
| 274 | Clock Signal Line |
| 275 | $Q_{NA}$ Output Line |
| 276-1 | $Q_{NB}$ Output Line |
| 278 | Exclusive NOR (XNOR) Gate |
| 280 | Counter |
| 282-1 | Inverter |
| 282-2 | Inverter |
| 284-1 | Resistor |
| 284-2 | Capacitor |
| 284-3 | Capacitor |
| 286 | Quartz Crystal |
| 288 | Oscillator Signal Line |
| 290-1 | Inverter |
| 290-2 | Inverter |
| 292 | Inverter |
| 294-1 | Resistor |
| 294-2 | Capacitor |
| 296 | Signal Line |
| 298-1 | NAND Gate |
| 298-2 | NAND Gate |
| 298-3 | NAND Gate |
| 299-1 | Resistor |
| 299-2 | Resistor |
| 300-1 | PNP Transistor |
| 300-2 | PNP Transistor |
| 302-1 | Pulse Transformer |
| 302-2 | Pulse Transformer |
| 304-1 | Drive Signal Output A1 |
| 304-2 | Drive Signal Output A2 |
| 306-1 | Drive Signal Output B1 |
| 306-2 | Drive Signal Output B2 |
| 309 | Capacitor |
| 310 | Resistor |
| 312 | +DC Power Line |
| 314 | Capacitor |
| 316 | Zener Diode |
| 330-1 | Prime Power Quadrant 1 |
| 330-2 | Suprafrequency Quadrant 1 |
| 330-3 | Suprafrequency Quadrant 1 |
| 332-1 | Prime Power Quadrant 2 |
| 332-2 | Suprafreq. Inverted Quadrant 2 |
| 332-3 | Suprafreq. Inverted Quadrant 2 |
| 334-1 | Prime Power Quadrant 3 |
| 334-2 | Suprafreq. Inverted Quadrant 3 |
| 334-3 | Suprafreq. Inverted Quadrant 3 |
| 336-1 | Prime Power Quadrant 4 |
| 336-2 | Suprafrequency Quadrant 4 |
| 336-3 | Suprafrequency Quadrant 4 |
| 340 | Power Transformer |
| 342-1 | First Primary (Normal) |
| 342-2 | Second Primary (Inverse) |
| 344 | Secondary |
| 346 | Load |
| 348 | Capacitor |
| 350 | Controller |
| 352-1 | Drive Signal A |
| 352-2 | Drive Signal B |
| 354-1 | Driver A |
| 354-2 | Driver B |
| 356-1 | Switch A |
| 356-2 | Switch B |
| 358-1 | Diode Bridge A |
| 358-2 | Diode Bridge B |
| 360 | Resistor |
| 362 | Capacitor |
| 364 | Signal Line |
| 366 | Diode |
| 370 | Resistor |
| 372 | Capacitor |
| 374 | Signal Line |
| 376 | Diode |
| 400 | Motor Structure |
| 402 | Pump Structure |
| 410 | Fluid Source |
| 412 | Fluid (e.g., water, etc.) |
| 420 | Pipe, Suction |
| 422 | Valve, Check |
| 424 | Pump Inlet |
| 426 | Pump Outlet |
| 430 | Valve, Flow Control |
| 432 | Spout |
| 434 | Flow |
| 440 | Storage Chamber |
| 450 | Controller |
| 452 | Controller Signal Lines |
| 460 | Intracyclic Switcher |
| 462 | First Field Signal Lines |
| 464 | Second Field Signal Lines |
| 470-1 | First Field Winding |
| 470-2 | Second Field Winding |
| 472 | Rotor |
| 474 | Pump Impeller |
| 476 | Coupling of Rotor to Impeller |
| 480 | Rectifier Diode |
| 482 | Positive Power Line |
| 484 | Capacitor |
| 490 | Rectifier Diode |
| 492 | Negative Power Line |
| 494 | Capacitor |
| 496 | Inductor P.F. Correction |
| 498 | Jumper |
| 500 | Power Diode Bridge |
| 502-1 | Bridge Output, Positive |
| 502-2 | DC Line, Positive |
| 504-1 | Bridge Output, Negative |
| 504-2 | DC Line, Negative |
| 506 | Capacitor |
| 508 | Diode |
| 510 | Inductor, P.F. Corrector |
| 511-1 | Coupling Depiction Line |
| 511-2 | Coupling Depiction Line |
| 514 | Flyback Diode |
| 516 | Flyback Diode |

What I claim for my invention is:

1. Parasynchronous control method for an electric induction motor comprising steps of:

securing circuit coupling with a source of prime frequency alternating current (AC) electric power comprising a continuum of bipolar AC power cycles implicating a first polarity half-cycle power signal portion alternating with a second polarity half-cycle power signal portion;

quadrisecting the bipolar AC power cycle whereby the first polarity half-cycle power signal portion is bisected into a first power signal quadrant portion and the second power signal quadrant portion, and the second polarity half-cycle portion signal portion is bisected into a third power signal quadrant portion and a fourth power signal quadrant portion;

selective first polarity coupling of the first power signal quadrant portion and the third power signal quadrant portion with a field excitation winding of an AC induction motor to establish a first magnemotive direction of current flow therethrough;

selective second polarity coupling of the second power signal quadrant portion and the fourth power signal quadrant portion with the field excitation winding to establish a second magnemotive direction of current flow therethrough; and, reversing the field excitation winding's induced sense of NORTH and SOUTH pole magnetic field polarity at a suprafrequency rate in response to a nexus of quadrant by quadrant alternation of said first magnemotive direction of current flow and said second magnemotive direction of current flow:

whereby, an induced parasynchronous motor output member rotational speed is obtained in a frequency-cum-rotation suprasynchronous range between:

$$RPM > 1.5 \times ((PLF \times 60)/NP)$$

and $$RPM < 2 \times ((PLF \times 60)/NP)$$

where:

PLF=AC electric power source prime line frequency, Hertz;

NP=Number of motor field poles.

RPM=Motor output member speed.

2. The parasynchronous control method of claim 1 wherein the selective first polarity coupling and the selective second polarity coupling comprises further steps of:

configuring the field excitation winding to include a first field winding portion and a second field winding portion with each field winding portion inducing a similar flux level of magnetic strength in the induction motor's field pole structure;

a first switching of a flow of the first power signal quadrant portion through the first field winding portion to establish a first pole magnetic sense in the induction motor's field pole structure;

a second switching of a flow of the second power signal quadrant portion through the second field winding portion to establish a second pole magnetic sense in the induction motor's said field pole structure;

a third switching of a flow of the third power signal quadrant portion through the second field winding portion to establish the first pole magnetic sense in the induction motor's said field pole structure; and, a fourth switching of a flow of the fourth power signal quadrant portion through the first field winding portion to establish the second pole magnetic sense in the induction motor's said field pole structure.

3. The parasynchronous control method of claim 1 wherein the selective first polarity coupling and the selective second polarity coupling comprises further steps of:

converting the continuum of bipolar AC power cycles into a continuum of unipolarity power quadrants of said half-cycle power pulse signals comprising a unipolarity nexus of the first power signal quadrant portions through the fourth power signal quadrant portions;

configuring the field excitation winding to include a first field winding portion and a second field winding portion with each field winding portion inducing a similar flux level of counterpolar magnetic strength in the induction motor's field pole structure;

a first switching of a flow of the first power signal quadrant portion of the nexus through the first field winding portion to establish a first pole magnetic sense in the induction motor's field pole structure;

a second switching of a flow of the second power signal quadrant portion of the nexus through the second field winding portion to establish a second pole magnetic sense in the induction motor's said field pole structure;

a third switching of a flow of the third power signal quadrant portion of the nexus through the first field winding portion to establish the first pole magnetic sense in the induction motor's said field pole structure; and, a fourth switching of a flow of the fourth power signal quadrant portion of the nexus through the second field winding portion to establish the second pole magnetic sense in the induction motor's said field pole structure.

4. The parasynchronous control method of claim 1 wherein the partitioning step comprises further steps of:

sensing AC power factor of the AC induction motor;

determining an increase in phase angle duration of the first power signal quadrant portion and third power signal quadrant portion relative with a corresponding decrease in the duration of the second power signal quadrant portion and fourth power signal quadrant portion in response to a first factorial change in the sensed AC power factor; and, determining a decrease in the phase angle duration of the first power signal quadrant portion and the third power signal quadrant portion relative with a corresponding increase in the duration of the second power signal quadrant portion and fourth power signal quadrant portion in response to a second factorial change in the sensed AC power factor.

5. The parasynchronous control method of claim 1 comprising further steps of:

winding the field excitation winding as two electrically separate winding portions;

inductively coupling the two winding portions to develop an equivalent strength of magnetic field flux in a stator pole structure of the electric induction motor;

securing said selective first polarity coupling with a first section of the two electrically separate winding portions;

phasing said selective first polarity coupling to develop an alternating NORTH and SOUTH sense of induced magnetic field in the stator pole structure;

securing said selective second polarity coupling with a second section of the two electrically separate winding portions;

phasing said selective second polarity coupling to develop an inversely alternating SOUTH and NORTH sense of said induced magnetic field in the stator pole structure.

6. The parasynchronous control method of claim 5 including at least two distinct parasynchronous speeds of operation and comprising further steps of:

disabling the selective first polarity coupling and the selective second polarity coupling with the two electrically separate winding portions;

arranging a electrical circuit coupling the two winding portions to additively complement field strength of the magnetic field flux developed in the stator pole structure of the electric induction motor;

securing a energizing cooperation between the two winding portions and the source of prime frequency alternating current (AC) electric power;

thereby obtaining the induced parasynchronous motor output member rotational speed in a frequency-cum-rotation near synchronous range between:

$$RPM > 0.75 \times ((PLF \times 60)/NP)$$

and $$RPM < 1 \times ((PLF \times 60)/NP)$$

where:

PLF=AC electric power source prime line frequency, Hertz;

NP=Number of motor field poles,

RPM=Motor output member speed.

7. Parasynchronous control method for an induction motor comprising the steps of:

securing circuit coupling with a source of prime frequency alternating current (AC) electric power comprising a continuum of bipolar AC power cycles implicating a first polarity half-cycle power signal portion alternating with a second polarity half-cycle power signal portion;

partitioning the bipolar AC power cycles into a nexus signal of bicyclic power signal clusters of alternating polarity half-cycle portions including a first polarity first half-cycle portion, a second polarity second half-cycle portion, a first polarity third half-cycle portion, and a second polarity fourth half cycle portion;

a determining of recurrent states of a normal sense polarity coupling of the first half cycle portion and an inverse sense polarity coupling of the second half cycle portion of the bicyclic power signal cluster with a field excitation winding of an AC induction motor to thereby establish a first magnemotive direction of current therethrough;

the determining of recurrent states of an inverse sense polarity coupling of the third half cycle portion and a normal sense polarity coupling of the fourth half cycle portion of the bicyclic power signal cluster with the field excitation winding of the AC induction motor to thereby establish a second magnemotive direction of current flow therethrough;

alternating the field excitation winding's induced sense of NORTH and SOUTH pole magnetic field polarity at a virtual subfrequency rate in response to the determination of pairs of virtual like-polarity half cycle portions of the bicyclic power signal clusters; and, whereby the virtual subfrequency rate of the reversal of the field excitation winding develops an induced subsynchronous rate of rotating magnetic field relative with a stator field pole structure portion of the AC induction motor and encourages a parasynchronous rate of motor output member rotational speed in a frequency-cum-rotational subsynchronous range between:

RPM>0.375×((PLF×60)/NP)

and

RPM<0.5×((PLF×60)/NP)

where:

PLF=AC electric power source prime line frequency, Hertz;

NP=Number of motor stator field poles,

RPM=Motor output member speed.

8. The parasynchronous control method of claim 7 wherein the determining of recurrent states of the bicyclic power signal cluster said coupling with the field excitation winding comprises further steps of:

configuring the field excitation winding to include a first field winding portion and a second field winding portion with each winding portion inducing a substantive level of counter-polar magnetic flux field strength in the stator field pole structure;

a first switching of a flow of the first polarity first half-cycle portion of the nexus signal through the first field winding portion to establish a first pole magnetic sense in the stator pole structure;

a second switching of a flow of the second polarity second half-cycle portion of the nexus signal through the second field winding portion to establish a first pole magnetic sense in the stator pole structure;

a third switching of a flow of the first polarity third half-cycle portion of the nexus signal through the second field winding portion to establish the second pole magnetic sense in the stator pole structure; and a fourth switching of a flow of the second polarity fourth half-cycle portion of the nexus signal through the first field winding portion to establish the second pole magnetic sense in the stator pole structure.

9. The parasynchronous control method of claim 7 wherein the determining of recurrent states of the bicyclic power signal cluster said coupling with the field excitation winding comprises further steps of:

converting the partitioned said bicyclic power signal clusters into a tetrapulsative succession of unipolar half-cycle power pulses;

configuring the field excitation winding to include a first field winding portion and a second field winding portion with each winding portion inducing a coequal level of counterpolar magnetic flux field strength in the stator field pole structure;

a first power flow switching of a biquadrantal first half-cycle portion of the bicyclic power signal cluster of unipolar half-cycle power pulses through the first field winding portion to establish a first field pole magnetic sense in the stator field pole structure;

a second power flow switching of a biquadrantal second half-cycle portion of the bicyclic power signal cluster of unipolar half-cycle power pulses through the first field winding portion to maintain the first field pole magnetic sense in the stator field pole structure;

a third power flow switching of a biquadrantal third half-cycle portion of the bicyclic power signal cluster of unipolar half-cycle power pulses through the second field winding portion to alternately establish a second field pole magnetic sense in the stator field pole structure; and, a fourth power flow switching of a biquadrantal fourth half-cycle portion of the bicyclic power signal cluster of unipolar half-cycle power pulses through the first field winding portion to maintain the second field pole magnetic sense in the stator field pole structure.

10. The parasynchronous control method of claim 7 wherein the driving of the field excitation windings obtain equivalence of the polarity inversion of the second half-cycle portion and the polarity inversion of the third half-cycle portion of the bicyclic power signal cluster through including the steps of:

structuring the field excitation windings to include a first field winding portion and a second field winding portion with each configuratively wound to induce a coequal level and transposed polar sense of magnetic field flux in the induction motor's said stator pole structure;

steering flow of the first half-cycle portion and the fourth half-cycle portion to flow through the first field winding portion thereby producing a normal polar sense of NORTH and SOUTH said magnetic field flux in the stator pole structure; and steering flow of the second half-cycle portion and the third half-cycle portion to flow through the second field winding portion thereby producing a transposed polar sense of SOUTH and NORTH said magnetic field flux in the stator pole structure.

11. The parasynchronous control method of claim 7 comprising further steps of:

winding the field excitation winding as two electrically separate winding portions;

configuring the two winding portions to develop an equivalent strength of magnetic field flux in the stator field pole structure of the electric induction motor;

a determining of recurrent states of a first polarity coupling said selective first polarity coupling with a first section of the two electrically separate winding portions;

phasing said selective first polarity coupling to develop an alternating NORTH and SOUTH sense of induced magnetic field in the stator field pole structure;

securing said selective second polarity coupling with a second section of the two electrically separate winding portions;

phasing said selective second polarity coupling to develop an inversely alternating SOUTH and NORTH sense of said induced magnetic field in the stator field pole structure.

12. The parasynchronous control method of claim 7 comprising further steps of:

winding the field excitation winding as two electrically separate winding portions;

configuring each of the two winding portions to develop a similar level of magnetic field flux in the stator field pole structure of the electric induction motor;

securing a first coupling of the first half cycle portion and the fourth half cycle portion of the cluster with a first section of the two electrically separate winding portions;

phasing said first coupling to develop a normal NORTH and SOUTH sense of induced magnetic flux field in the stator field pole structure;

securing a second coupling of the second half cycle portion and the third half cycle portion of the cluster with a second section of the two electrically separate winding portions; and, phasing said second coupling to develop a transposed SOUTH and NORTH sense of said induced magnetic flux field in the stator field pole structure.

13. The parasynchronous control method of claim 12 wherein a second near synchronous speed of operation may be obtained, therefor comprising further steps of:

disabling the first polarity coupling and the second polarity coupling with the two electrically separate winding portions;

arranging an electrical circuit coupling of the two winding portions to secure an additive complementation of said level of magnetic field flux developed in the stator pole structure by each of the two winding portions;

securing a energizing cooperation between the two winding portions and the source of prime frequency alternating current (AC) electric power; and, developing the motor output member rotational speed to occur in the frequency-cum-rotation and near synchronous range between:

$$RPM > 0.75 \times ((PLF \times 60)/NP)$$

and $$RPM < 1 \times ((PLF \times 60)/NP)$$

where:

PLF=AC electric power source prime line frequency, Hertz;

NP=Number of motor stator field poles.

RPM=Motor output member speed.

14. Parasynchronous induction motor control method for producing an exceptional rate of rotational speed of an output member portion of an electric induction motor and comprising steps of:

securing coupling of the electric induction motor with a prime frequency source of alternating current (AC) electric power delivered as a consecution of quadrantal portions of AC electric power cycles;

switching of an instant quadrant-by-quadrant positive and negative polarity sense of the consecution of quadrantal portions relative with a predetermined pattern intently defining a virtual pseudofrequency rate;

whereby the virtual pseudofrequency rate of quadrantal polarity reversals of the consecution of quadrantal portions coupled with a field winding portion of the electric induction motor induces said exceptional rate of output member rotational speed in a frequency-cum-rotation parasynchronous range between:

$$RPM > 0.75 \times ((VPF \times 60)/NP)$$

and $$RPM < 2 \times ((VPF \times 60)/NP)$$

where:

VPF=Virtual pseudofrequency rate of power signal quadrantal portion polarity reversals NP=Number of motor stator field poles RPM=Motor output member rotational speed.

15. The parasynchronous induction motor control method of claim 14 wherein the switching of an instant quadrant-by-quadrant positive and negative polarity sense of each successive power signal said quadrantal portion serves to intently develop the virtual pseudofrequency rate of the power signal quadrantal polarity reversals coupled with the field winding portion of the electric induction motor, including quadrantal polarity switching steps producing:

a normal polarity sense coupling of a first power signal quadrant portion;

an inverse polarity sense coupling of a second power signal quadrant portion the inverse polarity sense coupling of a third power signal quadrant portion; and, the normal polarity sense coupling of a fourth power signal quadrant portion;

whereby a virtual suprafrequency recurrence of said virtual pseudofrequency VPF rate of field winding magnetic field flux reversals occur which may substantially increase the usual rate of motor output member rotational speed.

16. The parasynchronous induction motor control method of claim 14 wherein the predetermined pattern defining the virtual pseudofrequency rate comprises further steps of:

partitioning the AC electric power cycles into bicyclic clusters wherein each cluster comprises a series of four alternating polarity half-cycle portions including a nexus signal of eight quadrantal portions;

said switching instant quadrant-by-quadrant positive and negative polarity sense of each said consecutive quadrantal portion of the nexus signal to intently develop the virtual pseudofrequency rate as a consecution of quadrantal polarity reversals coupled with a field winding portion of the electric induction motor, therefor including quadrantal polarity switching steps producing:

a normal biquadrantal polarity sense coupling of a first half-cycle portion of the AC electric power cycle;

an inverse biquadrantal polarity sense coupling of a second half-cycle portion of the AC electric power cycle;

the inverse biquadrantal polarity sense coupling of a third half-cycle portion of the AC electric power cycle; and, the normal biquadrantal polarity sense coupling of a fourth half-cycle portion of the AC electric power cycle;

whereby a subfrequency recurrence of said virtual pseudofrequency VPF rate of the field winding induced magnetic field flux reversals occur which may substantially decrease the usual rate of motor output member rotational speed.

17. The parasynchronous induction motor control method of claim 14 comprising further steps of:

winding the field winding portion of the electric induction motor to include a first winding portion and a second winding portion with each winding portion configured to induce a similar level of magnetic flux field strength in a stator field pole structure of the electric induction motor;

phasing the first winding portion and the second winding portion to said induce an opposite polarity sense of said magnetic flux field strength;

directing current flow of a first power signal quadrant portion through the first field winding portion to said induce a normal magnetic field polarity sense in the stator field pole structure;

redirecting current flow of a second power signal quadrant portion through the second field winding portion to said induce an inverse magnetic field polarity sense in the stator field pole structure;

said redirecting current flow of a third power signal quadrant portion through the second field winding portion to said induce said normal magnetic field polarity sense in the stator field pole structure; and, said directing current flow of a fourth power signal quadrant portion through the first field winding portion to said induces said inverse magnetic field polarity sense in the stator field pole structure;

whereby, a suprasynchronous rate of magnetic field rotation develops about the stator field pole structure of the induction motor which encourages an inductively coupled rotor member to rotate at a rate about double that which may be conventionally obtained from the prime frequency source of AC electric power.

18. The parasynchronous induction motor control method of claim 14 comprising further steps of:

partitioning a profluence of the AC electric power cycles into bicyclic clusters of the consecutive quadrantal portions with each cluster comprising a nexus of four alternating polarity half-cycle portions including eight power signal quadrantal portions;

winding the field winding portion of the electric induction motor to include a first winding portion and a second winding portion with each winding portion configured to induce a similar level of magnetic flux field strength in a stator field pole structure of the electric induction motor;

phasing the first winding portion and the second winding portion to respectively said induce an opposite polarity sense of said magnetic flux field strength;

directing current flow of a first biquadrantal half-cycle portion through the first field winding portion to said induce a normal magnetic field polarity sense in the stator field pole structure;

redirecting current flow of a second biquadrantal half-cycle portion through the second field winding portion to maintain induction of the normal magnetic field polarity sense in the stator field pole structure;

said redirecting current flow of a third biquadrantal half-cycle portion through the second field winding portion to said induce an inverse magnetic field polarity sense in the stator field pole structure; and, said directing current flow of a fourth biquadrantal half-cycle portion through the first field winding portion to maintain induction of said inverse magnetic field polarity sense in the stator field pole structure, whereby, a subsynchronous rate of magnetic field rotation develops about the stator field pole structure of the induction motor which encourages an inductively coupled rotor member to rotate at a rate about one-half that which may be conventionally obtained from the prime frequency source of AC electric power.

19. The parasynchronous induction motor control method of claim 14 comprising further steps of:

converting of the consecution of quadrantal portions into a nexus signal of quadrantal duration alternating direction of current flow which alternates twice relative with each AC electric power cycle and which flows through the field winding portion of the electric induction motor and therefor comprising:

switching of a first quadrantal portion of the nexus to produce a forward current flow through the field winding portion and induce a first magnetic flux field NORTH and SOUTH polar sense in a stator field pole structure of the electric induction motor;

switching of a second quadrantal portion of the nexus to produce a reverse current flow through the field winding portion and said induce a second magnetic flux field SOUTH and NORTH polar sense in the stator field pole structure;

switching of a third quadrantal portion of the nexus to produce a reverse current flow through the field winding portion and said induce the first magnetic flux field NORTH and SOUTH polar sense in the stator field pole structure;

switching of a fourth quadrantal portion of the nexus to produce a forward current flow through the field winding portion and said induce the second magnetic flux field SOUTH and NORTH polar sense in the stator field pole structure; and, developing a virtual suprafrequency excitation of the stator field pole structure in response to the nexus signal;

thereby, inducing of a suprasynchronous rate of said exceptional output member rotational speed.

20. The parasynchronous induction motor control method of claim 14 comprising further steps of:

treating the consecution of quadrantal portions as a consecution of bicyclic clusters comprising a nexus signal of fourth alternating polarity electric power biquadrantal half-cycle portions;

switching of a first said electric power biquadrantal half-cycle portion of the nexus signal to produce forward current flow through the field winding portion and induce a first direction of magnetic flux field NORTH and SOUTH polar sense in a stator field pole structure of the electric induction motor;

the switching of a second said electric power biquadrantal half-cycle portion of the nexus signal to produce reverse current flow through the field winding portion and continue to induce the first direction of magnetic flux field NORTH and SOUTH polar sense in the stator field pole structure;

the switching of a third said electric power biquadrantal half-cycle portion of the nexus signal to produce reverse current flow through the field winding portion and induce a second direction of magnetic flux field SOUTH and NORTH polar sense in the stator field pole structure;

the switching of a fourth said electric power biquadrantal half-cycle portion of the nexus signal to produce a forward current flow through the field winding portion and continue to induce the second direction of magnetic flux field SOUTH and NORTH polar sense in the stator field pole structure; and, developing a virtual subfrequency excitation of the stator field pole structure in response to the nexus signal;

thereby, inducing a subsynchronous rate of said exceptional output member rotational speed.

21. The parasynchronous induction motor control method of claim 15 wherein the substantially increased said motor output member rotational speed is utilized to operate an impeller portion of a centrifugal pump, comprising:

integrating the induction motor with a centrifugal pump coupling the motor output member with an impeller member of the centrifugal pump; and, spinning the impeller member at the suprasynchronous rate of said exceptional motor output member rotational speed delivered by the induction motor.

* * * * *